US011474249B2

(12) United States Patent
Gupta et al.

(10) Patent No.: US 11,474,249 B2
(45) Date of Patent: Oct. 18, 2022

(54) SYSTEMS, METHODS, AND MEDIA FOR STOCHASTIC EXPOSURE CODING THAT MITIGATES MULTI-CAMERA INTERFERENCE IN CONTINUOUS WAVE TIME-OF-FLIGHT IMAGING

(71) Applicant: Wisconsin Alumni Research Foundation, Madison, WI (US)

(72) Inventors: Mohit Gupta, Madison, WI (US); Jongho Lee, Madison, WI (US)

(73) Assignee: Wisconsin Alumni Reseach Foundation, Madison, WI (US)

( * ) Notice: Subject to any disclaimer, the term of this patent is extended or adjusted under 35 U.S.C. 154(b) by 642 days.

(21) Appl. No.: 16/556,119

(22) Filed: Aug. 29, 2019

(65) Prior Publication Data

US 2021/0063576 A1    Mar. 4, 2021

(51) Int. Cl.
*G01S 17/89* (2020.01)
*G06T 7/521* (2017.01)
*G01S 17/10* (2020.01)

(52) U.S. Cl.
CPC .............. *G01S 17/89* (2013.01); *G01S 17/10* (2013.01); *G06T 7/521* (2017.01)

(58) Field of Classification Search
CPC .......... G01S 17/89; G01S 17/10; G01S 7/493; G01S 17/894; G01S 17/36; G01S 7/4863; G01S 7/484; G01S 7/4865; G01S 17/86; G01S 7/4816; G01S 17/46; G01S 17/931; G01S 7/491; G01S 7/4912; G01S 17/42; G01S 7/4815; G01S 7/497; G01S 17/87; G01S 17/18; G01S 7/4972; G01S 17/48; G01S 7/003; G01S 7/4911; G01S 7/4915; G01S 17/32; G01S 17/34; G01S 19/14; G01S 19/43; G01S 7/481; G01S 7/4866; G01S 7/4868; G01S 7/487; G01S 7/4873;
(Continued)

(56) References Cited

U.S. PATENT DOCUMENTS 10,645,367 B2 *   5/2020  Gupta ................. G01S 7/4915
2019/0346570 A1 * 11/2019  Ortiz Egea .......... G01S 7/4863

OTHER PUBLICATIONS

Achar, S. et al. Epipolar time-of-flight imaging. ACM Transactions on Graphics (ToG), 36(4):37, 2017.
(Continued)

*Primary Examiner* — Yuqing Xiao
*Assistant Examiner* — Amir J Askarian
(74) *Attorney, Agent, or Firm* — Quarles & Brady, LLP

(57) ABSTRACT

In accordance with some embodiments, systems, methods and media for stochastic exposure coding for continuous time-of-flight imaging are provided. In some embodiments, a method for estimating the depth of a scene is provided, comprising: stochastically selecting active slots based on a probability p; causing, during active slots, a light source to emit light modulated by a first modulation function toward a scene; causing, during active slots, an image sensor to generate a first, second, and third value based on received light from a portion of the scene and a first, second, and third demodulation function, respectively; inhibiting the light source during inactive slots; determining, for each of the active slots, depth estimates for the portion of the scene based on the first, second, and third value; and determining a depth estimate for the portion of the scene based on the depth estimates for the active slots.

18 Claims, 12 Drawing Sheets

(58) Field of Classification Search
CPC ........ G01S 17/08; G01S 17/50; G01S 7/4817;
G01S 7/4876; G01S 7/4914; G01S 17/74;
G01S 7/4802; G01S 7/4808; G01S
7/4812; G01S 7/4814; G01S 7/499; G06T
7/521; G06T 7/85; G06T 2207/10012;
G06T 19/006; G06T 2207/10028; G06T
5/002; G06T 7/00; G06T 7/514; G06T
7/11; G06T 7/593; G06T 2207/20221;
G06T 5/007; G06T 5/50
See application file for complete search history.

(56) References Cited

OTHER PUBLICATIONS

Buttgen, B. et al. Pseudonoise optical modulation for real-time 3-d imaging with minimum interference. IEEE Transactions on Circuits and Systems I:Regular Papers, 54(10):2109-2119, 2007.

Buttgen B. et al. Robust optical time-of-flight range imaging based on smart pixel structures. IEEE Trans. On Circuits and Systems, 55(6):1512-1525, 2008.

Fersch, T. et al. A cdma modulation technique for automotive time-of-flight lidar systems IEEE Sensors Journal, 17 (11):3507-3516, 2017.

Li, L. et al. Multi-camera interference cancellation of time-of flight (tof) cameras. In Image Processing (ICIP), 2015 IEEE International Conference on, pp. 556-560. IEEE, 2015.

Min, D.-K. et al. Pseudo random modulation for multiple 3d time-of-flight camera operation. In Three-Dimensional Image Processing (3DIP) and Applications 2013, vol. 8650, p. 865008. International Society for Optics and Photonics,2013.

Whyte, R.Z. et al. Multiple range imaging camera operation with minimal performance impact. In Image Processing: Machine Vision Applications III, vol. 7538, p. 753801. International Society for Optics and Photonics, 2010.

* cited by examiner

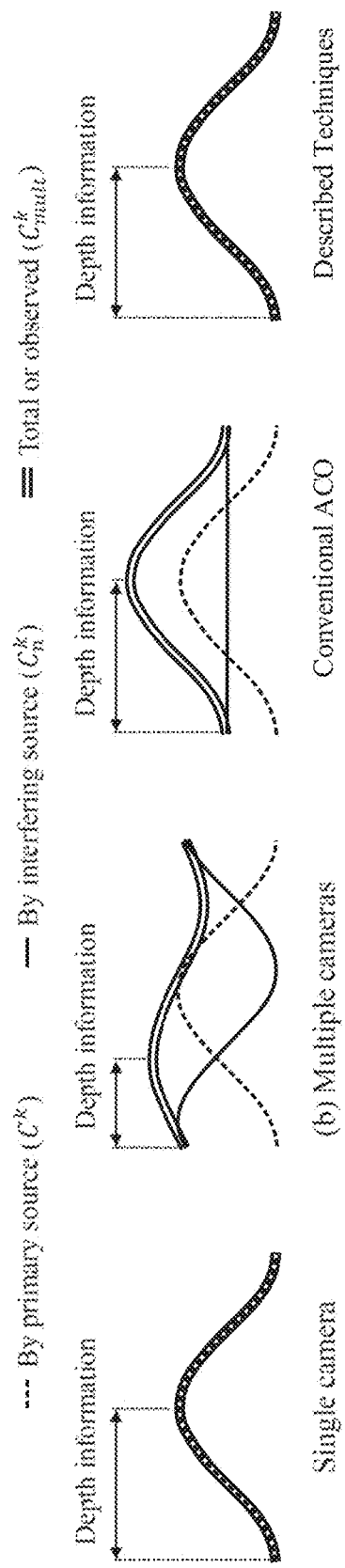
FIG. 2A  Single camera
FIG. 2B  (b) Multiple cameras
FIG. 2C  Conventional ACO
FIG. 2D  Described Techniques
--- By primary source ($C^k$)  — By interfering source ($C_n^k$)  ═ Total or observed ($C_{mult}^k$)
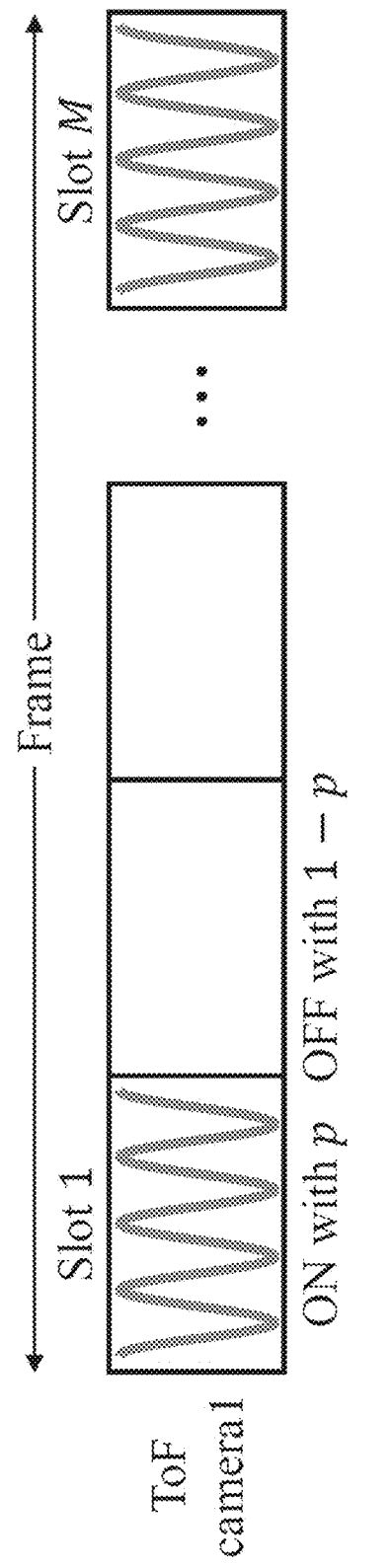
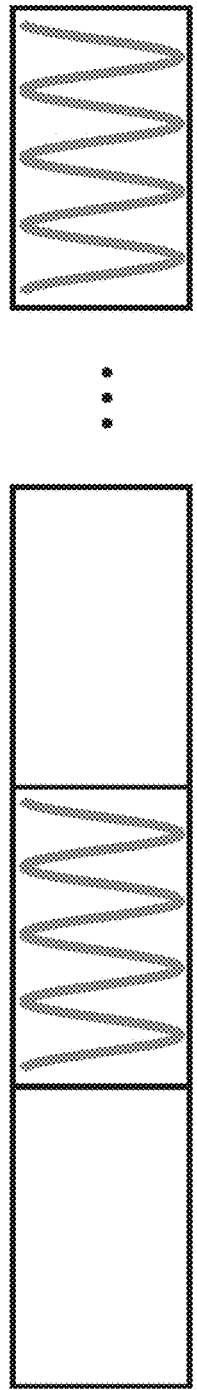
FIG. 3

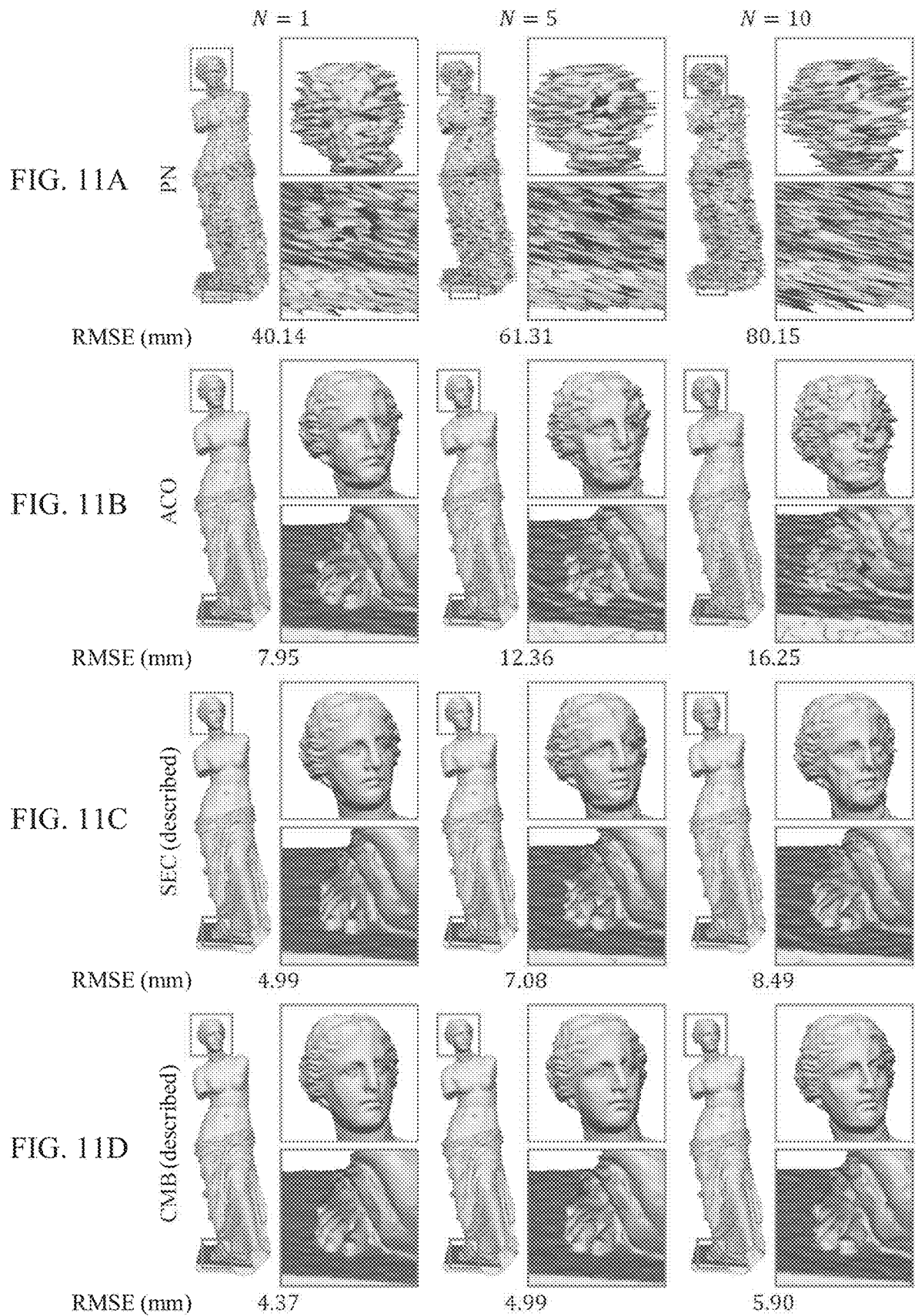

Front view

Top view

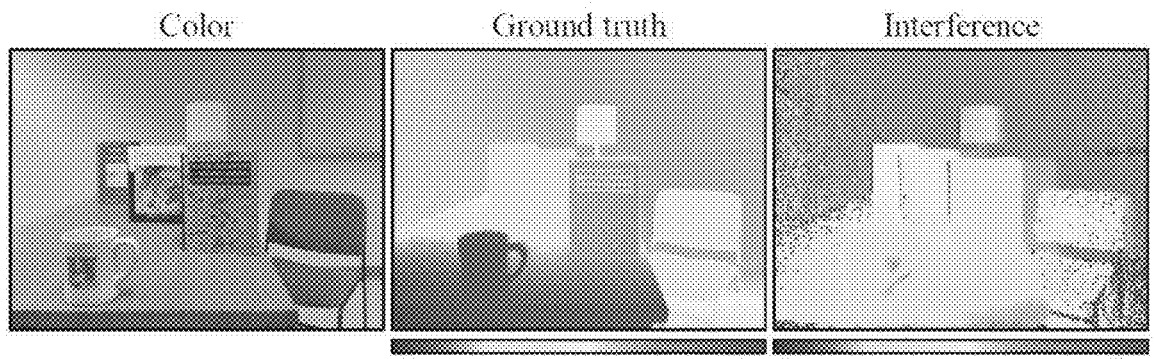
FIG. 14A    FIG. 14B    FIG. 14C
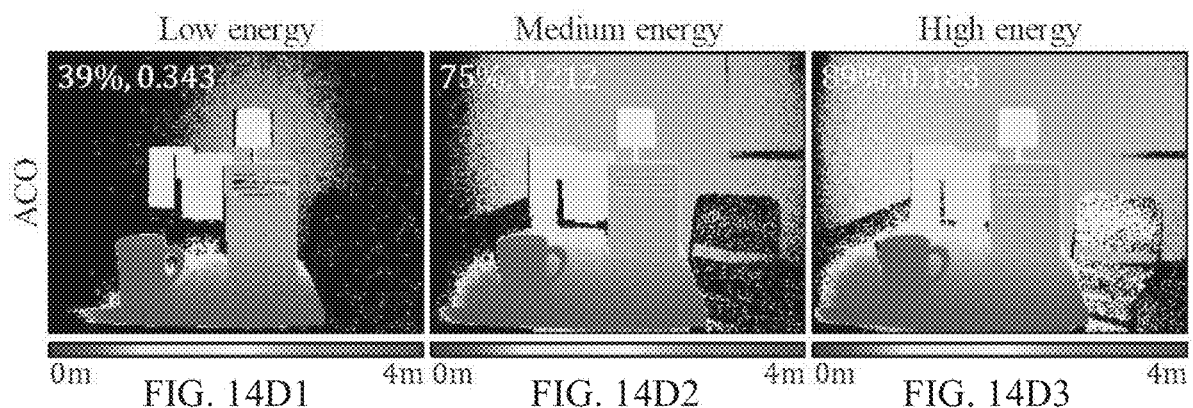
FIG. 14D1    FIG. 14D2    FIG. 14D3
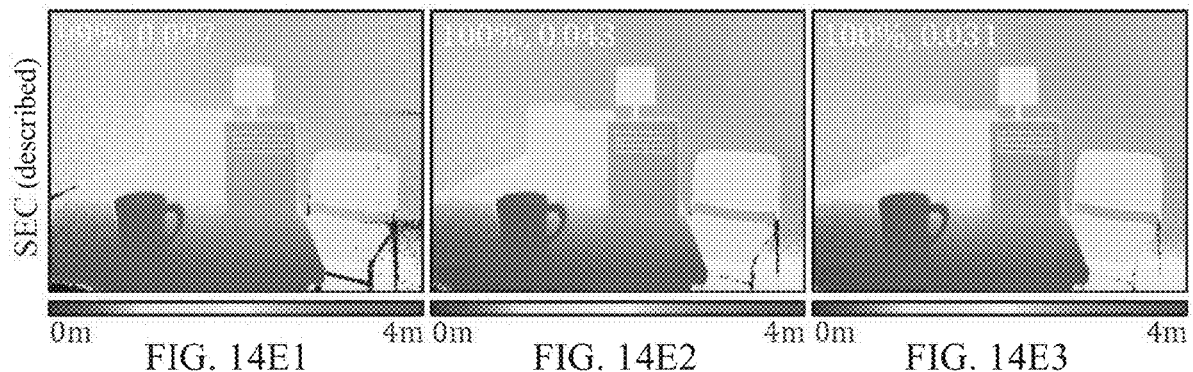
FIG. 14E1    FIG. 14E2    FIG. 14E3
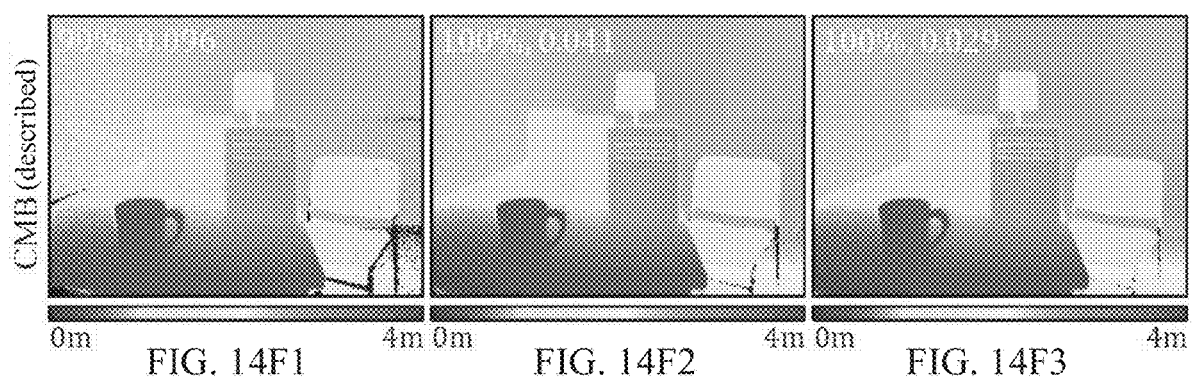
FIG. 14F1    FIG. 14F2    FIG. 14F3

SYSTEMS, METHODS, AND MEDIA FOR STOCHASTIC EXPOSURE CODING THAT MITIGATES MULTI-CAMERA INTERFERENCE IN CONTINUOUS WAVE TIME-OF-FLIGHT IMAGING

STATEMENT REGARDING FEDERALLY SPONSORED RESEARCH

This invention was made with government support under N00014-16-1-2995 awarded by the NAVY/ONR and HR0011-16-C-0025 awarded by the DOD/DARPA. The government has certain rights in the invention.

CROSS-REFERENCE TO RELATED APPLICATIONS

N/A

BACKGROUND

In recent years, time-of-flight (ToF) cameras have become increasingly common for various 3D imaging applications, such as 3D mapping, human-machine interaction, augmented reality, and robot navigation. ToF cameras typically have compact form-factors and low computational complexity, which has resulted in the emergence of several commodity ToF cameras. As these cameras become ubiquitous in mobile devices and cell-phones, they will face an important problem: multi-camera interference (MCI). This is especially critical for continuous wave ToF (C-ToF) imaging, where the light source continuously emits light. When several C-ToF cameras capture the same scene concurrently, each sensor may receive light from the sources of other cameras. This interfering signal can negatively affect correct depth estimation, resulting in potentially large, structured errors.

Many existing approaches for reducing multi-camera interference in continuous wave time-of-flight imaging are based on using orthogonal coding functions, such as sinusoids of different modulation frequencies for different cameras, or pseudo-noise (PN) sequences. Another approach divides the total integration time into multiple time slots and varies the phase of the modulation and demodulation signals pseudo-randomly. While these approaches can reduce AC interference, they still generally suffer from DC interference caused by the light sources of interfering cameras increasing photon noise.

Another recent approach for reducing multi-camera interference is to project light only along a planar sheet which is scanned over the scene. Since only a portion of the scene is illuminated at a time, the chance of interference by other cameras can be reduced. Although this approach can also reduce DC interference, it requires mechanical scanning and cannot capture depth information from all points in a scene simultaneously.

Accordingly, systems, methods, and media described herein for stochastic exposure coding that mitigates multi-camera interference in continuous wave time-of-flight imaging are desirable.

SUMMARY

In accordance with some embodiments of the disclosed subject matter, systems, methods, and media described herein for stochastic exposure coding that mitigates multi-camera interference in continuous wave time-of-flight imaging are provided.

In accordance with some embodiments, a system for estimating the depth of a scene is provided, the system comprising: a light source; an image sensor comprising at least one pixel; a signal generator configured to output at least: a first signal corresponding to a modulation function; at least one hardware processor that is programmed to: stochastically select, from a plurality of slots each corresponding to a portion of a total capture time, a first subset of the plurality of slots as active slots and a second subset of the plurality of slots as inactive slots based on a probability p of activating each slot of the plurality of slots; cause, during each of the active slots, the light source to emit first modulated light toward the scene with modulation based on the first signal; cause, during each of the active slots, the image sensor to generate a first value based on the light received from a portion of the scene and a second signal corresponding to a first demodulation function; cause, during each of the active slots, the image sensor to generate a second value based on light received from the portion of the scene and a third signal corresponding to a second demodulation function; cause, during each of the active slots, the image sensor to generate a third value based on light received from the portion of the scene and a fourth signal corresponding to a third demodulation function; inhibit, during each of the inactive slots, the light source from emitting modulated light toward the scene; determine, for each of a plurality of the active slots, a depth estimate for the portion of the scene based on the first value, the second value, and the third value; and determine, for the total capture time, a depth estimate for the portion of the scene based on the depth estimates for each of the plurality of the active slots.

In some embodiments, the at least one hardware processor that is further programmed to: determine, for each active slot, a total intensity received by the image sensor during the active slot; determine that a clash has occurred for each active slot in which the total intensity exceeds a threshold; and in response to determining that a clash has occurred for a particular active slot, exclude that active slot from the plurality of active slots.

In some embodiments, the at least one hardware processor is further programmed to: determine a mean total intensity value based on the total intensity values for each active slot; and set the threshold based on a standard deviation of the total intensity values and the mean total intensity value.

In some embodiments, each slot has a duration of in a range of 0.5 ms to 1.0 ms.

In some embodiments, the at least one hardware processor that is further programmed to: determine, for all of the active slots, a depth estimate for the portion of the scene based on the first value, the second value, and the third value; and determine, for the total capture time, a depth estimate for the portion of the scene based on the depth estimates for each of the active slots.

In some embodiments, the probability p of activating each slot of the plurality of slots is based on the relationship $p=1/A_0$, where $A_0$ represents a peak power of the light source.

In accordance with some embodiments of the disclosed subject matter, a method for estimating the depth of a scene is provided, the method comprising: stochastically selecting, from a plurality of slots each corresponding to a portion of a total capture time, a first subset of the plurality of slots as active slots and a second subset of the plurality of slots as inactive slots based on a probability p of activating each slot of the plurality of slots; causing, during each of the active slots, a light source to emit first modulated light toward the scene with modulation based on a first signal corresponding to a first modulation function; causing, during each of the active slots, an image sensor to generate a first value based on the light received from a portion of the scene and a second signal corresponding to a first demodulation function; causing, during each of the active slots, the image sensor to generate a second value based on light received from the portion of the scene and a third signal corresponding to a second demodulation function; causing, during each of the active slots, the image sensor to generate a third value based on light received from the portion of the scene and a fourth signal corresponding to a third demodulation function; inhibiting, during each of the inactive slots, the light source from emitting modulated light toward the scene; determining, for each of a plurality of the active slots, a depth estimate for the portion of the scene based on the first value, the second value, and the third value; and determining, for the total capture time, a depth estimate for the portion of the scene based on the depth estimates for each of the plurality of the active slots.

In accordance with some embodiments of the disclosed subject matter, a non-transitory computer readable medium containing computer executable instructions that, when executed by a processor, cause the processor to perform a method for estimating the depth of a scene is provided, the method comprising: stochastically selecting, from a plurality of slots each corresponding to a portion of a total capture time, a first subset of the plurality of slots as active slots and a second subset of the plurality of slots as inactive slots based on a probability p of activating each slot of the plurality of slots; causing, during each of the active slots, a light source to emit first modulated light toward the scene with modulation based on a first signal corresponding to a first modulation function; causing, during each of the active slots, an image sensor to generate a first value based on the light received from a portion of the scene and a second signal corresponding to a first demodulation function; causing, during each of the active slots, the image sensor to generate a second value based on light received from the portion of the scene and a third signal corresponding to a second demodulation function; causing, during each of the active slots, the image sensor to generate a third value based on light received from the portion of the scene and a fourth signal corresponding to a third demodulation function; inhibiting, during each of the inactive slots, the light source from emitting modulated light toward the scene; determining, for each of a plurality of the active slots, a depth estimate for the portion of the scene based on the first value, the second value, and the third value; and determining, for the total capture time, a depth estimate for the portion of the scene based on the depth estimates for each of the plurality of the active slots.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2A shows an example of depth information that can be recovered using a conventional continuous wave time-of-flight camera in the absence of other continuous wave time-of-flight light cameras.

FIG. 2B shows an example of AC noise and DC noise caused by the presence of multiple conventional continuous wave time-of-flight cameras using the same coding scheme.

FIG. 2C shows an example of DC noise caused by the presence of multiple conventional continuous wave time-of-flight cameras using different coding schemes.

FIG. 2D shows an example of depth information that can be recovered using a continuous wave time-of-flight camera in the presence of other continuous wave time-of-flight light cameras implemented in accordance with some embodiments of the disclosed subject matter.

FIG. 3 shows an example of emission timing of multiple continuous wave time-of-flight cameras implementing stochastic exposure coding in accordance with some embodiments of the disclosed subject matter.

FIG. 11A shows examples of 3D model reconstruction over different numbers of interfering cameras for a pseudo-noise-based depth coding (PN) scheme and associated root mean squared error (RMSE) values in millimeters (mm).

FIG. 11B shows examples of 3D model reconstruction over different numbers of interfering cameras for an orthogonal AC depth coding (ACO) scheme and associated RMSE values (mm).

FIG. 11C shows examples of 3D model reconstruction over different numbers of interfering cameras for a stochastic exposure coding (SEC) scheme and associated RMSE values (mm).

FIG. 11D shows examples of 3D model reconstruction over different numbers of interfering cameras for a multi-layer coding (CMB) scheme and associated RMSE values (mm).

FIG. 14A shows an example of a scene including objects on a table at various depths and with various different properties.

FIG. 14B shows an example of ground truth depths of the scene depicted in FIG. 14A.

FIG. 14C shows an example of depths of the scene depicted in FIG. 14A calculated based on values generated by one of the continuous wave time-of-flight cameras depicted as part of the system shown in FIGS. 12A and 12B with the four cameras each using an overlapping depth coding scheme.

FIG. 14D1 shows an example of depths of the scene depicted in FIG. 14A calculated based on values generated by one of the continuous wave time-of-flight cameras depicted as part of the system shown in FIGS. 12A and 12B with the four cameras implementing an orthogonal AC depth coding (ACO) scheme with relatively low energy consumption by using a relatively short integration time of 0.83 milliseconds (ms).

FIG. 14D2 shows an example of depths of the scene depicted in FIG. 14A calculated based on values generated by one of the continuous wave time-of-flight cameras depicted as part of the system shown in FIGS. 12A and 12B with the four cameras implementing an ACO scheme with a higher energy consumption by using a longer integration time of 1.83 ms.

FIG. 14D3 shows an example of depths of the scene depicted in FIG. 14A calculated based on values generated by one of the continuous wave time-of-flight cameras depicted as part of the system shown in FIGS. 12A and 12B with the four cameras implementing an ACO scheme with a yet higher energy consumption by using a yet longer integration time of 2.83 ms.

FIG. 14E1 shows an example of depths of the scene depicted in FIG. 14A calculated based on values generated by one of the continuous wave time-of-flight cameras depicted as part of the system shown in FIGS. 12A and 12B with the four cameras implementing a stochastic exposure coding (SEC) scheme with relatively low energy consumption by using a relatively short integration time of 0.83 ms.

FIG. 14E2 shows an example of depths of the scene depicted in FIG. 14A calculated based on values generated by one of the continuous wave time-of-flight cameras depicted as part of the system shown in FIGS. 12A and 12B with the four cameras implementing a stochastic exposure coding (SEC) scheme with higher energy consumption by using a longer integration time of 1.83 ms.

FIG. 14E3 shows an example of depths of the scene depicted in FIG. 14A calculated based on values generated by one of the continuous wave time-of-flight cameras depicted as part of the system shown in FIGS. 12A and 12B with the four cameras implementing a stochastic exposure coding (SEC) scheme with yet higher energy consumption by using a yet longer integration time of 2.83 ms.

FIG. 14F1 shows an example of depths of the scene depicted in FIG. 14A calculated based on values generated by one of the continuous wave time-of-flight cameras depicted as part of the system shown in FIGS. 12A and 12B with the four cameras implementing a multi-layer coding (CMB) scheme with relatively low energy consumption by using a relatively short integration time of 0.83 ms.

FIG. 14F2 shows an example of depths of the scene depicted in FIG. 14A calculated based on values generated by one of the continuous wave time-of-flight cameras depicted as part of the system shown in FIGS. 12A and 12B with the four cameras implementing a multi-layer coding (CMB) scheme with higher energy consumption by using a longer integration time of 1.83 ms.

FIG. 14F3 shows an example of depths of the scene depicted in FIG. 14A calculated based on values generated by one of the continuous wave time-of-flight cameras depicted as part of the system shown in FIGS. 12A and 12B with the four cameras implementing a multi-layer coding (CMB) scheme with yet higher energy consumption by using a yet longer integration time of 2.83 ms.

DETAILED DESCRIPTION

Figure 1:
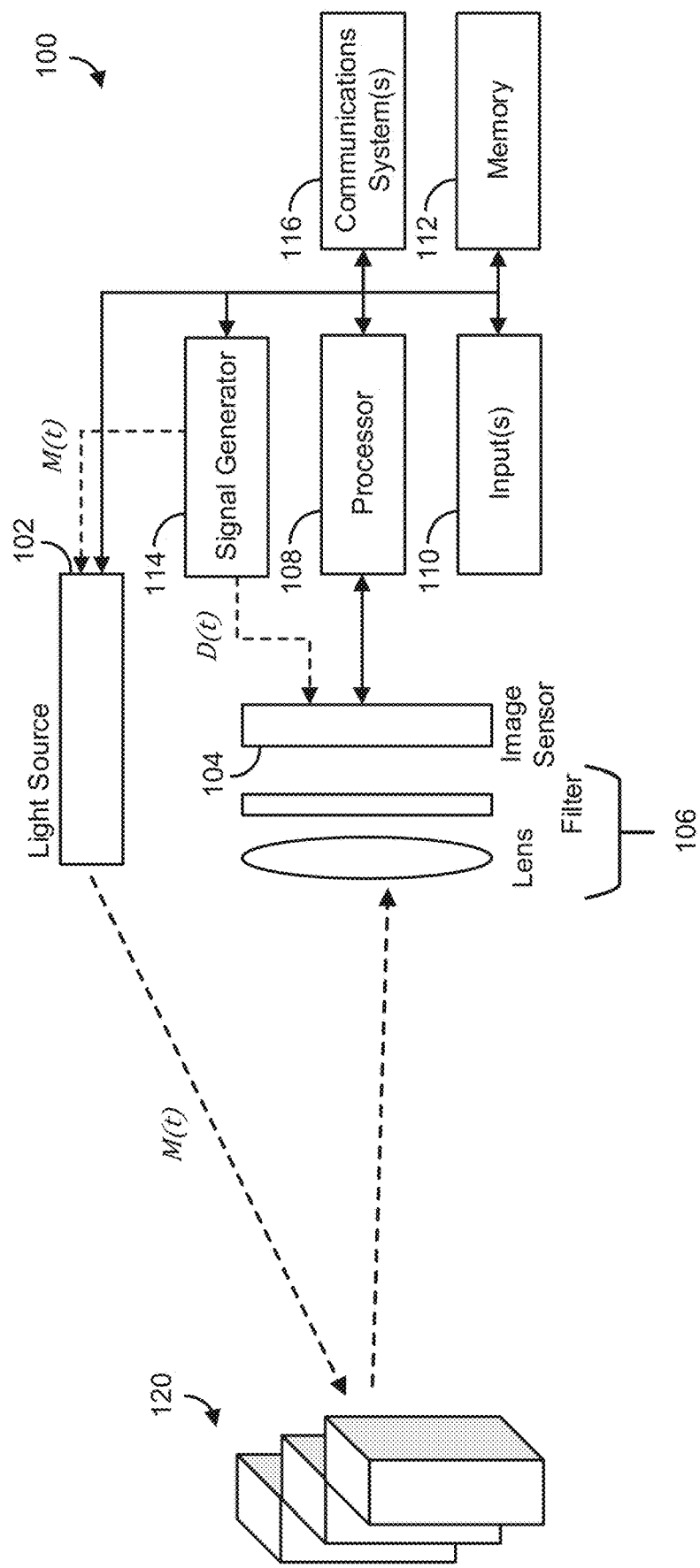
FIG. 1 shows an example of a system for continuous wave time-of-flight imaging in accordance with some embodiments of the disclosed subject matter.

In accordance with various embodiments, mechanisms (which can, for example, include systems, methods, and media) for stochastic exposure coding that mitigates multi-camera interference in continuous wave time-of-flight imaging are provided.

In general, multi-camera interference can be mitigated using orthogonal coding functions for different C-ToF cameras. For example, different cameras can use sinusoids of different frequencies or randomized phases, or pseudo-random functions as modulation and/or demodulation functions. Such approaches, while theoretically capable of mitigating interference, have practical limitations. The intensity of light emitted by a ToF camera's source is positive, with both a constant (sometimes referred to herein as DC) component and an oscillating (sometimes referred to herein as AC) component, with the depth information being encoded in the time-shift of the AC component. Although orthogonal-coding approaches can remove the interfering AC components, a DC component that can be attributed to interfering cameras remains. The interfering DC component can act as additional ambient light, causing an increase in photon noise that is not present in the absence of interfering C-ToF cameras. As the number of interfering cameras increases, the signal-to-noise ratio (SNR) can degrade considerably due to this DC interference, making it challenging to recover meaningful information.

In some embodiments, mechanisms described herein can mitigate depth errors caused by DC interference by applying techniques that are somewhat similar to time-division multiple access techniques that are widely used for facilitating multi-user access of shared electronic communication channels. Using such techniques, a single shared communication channel can be divided into multiple time slots, and each slot can be assigned to a particular user. In order to prevent interference, time-division multiple access techniques generally use a central authority (e.g., base stations in a cellular communications system). The need for timing synchronization makes time-division multiple access techniques poorly suited for direct application in addressing MCI, as cameras are not otherwise configured to rely on a central authority to provide operational parameters.

In some embodiments, the mechanisms described herein can divide the total exposure time of a camera into multiple slots, and can stochastically determine which of the slots to utilize. Techniques that stochastically determine which of multiple time slots to utilize are sometimes referred to herein as stochastic exposure coding (SEC) techniques. In some embodiments, a device implementing techniques described herein can activate a light source with a particular probability $p_{ON}$. In such embodiments, multiple C-ToF cameras that are imaging the same scene can each apply SEC techniques, and if only a single camera is active during a particular slot both DC and AC multi camera interference can be mitigated due to the active camera receiving modulated light emitted only by its own source.

In some embodiments, the mechanisms described herein can be used to select a probability pON that mitigates the number of slots in which multiple cameras are active, which can be referred to as clashes. However, as SEC techniques are stochastic in nature and do not involve explicit synchronization, clashes still may occur. In some embodiments, the mechanisms described herein can implement a clash-check process to identify and discard data from time slots in which a clash occurred so that the data does not affect depth estimation.

In general, a relatively higher pON tends to increase the likelihood of clashes, which can result in interference and depth errors, while a relatively lower pON reduces the incidence of clashes, but also reduces the total signal detected by the camera as it is inactive during a higher percentage of the integration time. As described below, an optimal pON can be determined given system constraints and the number of interfering cameras, which can facilitate each source activating sufficiently sparsely to mitigate multi-camera interference (both DC and AC) without explicit synchronization, while maintaining a relatively high SNR within a fixed time and power budget.

In some embodiments, the mechanisms described herein can apply SEC techniques to C-ToF camera without significant modifications to the underlying coding functions, and thus, SEC techniques can be implemented without extensive hardware modifications. As described below in connection with FIGS. 4A to 4C, multi-camera interference can be mitigated using techniques in multiple different independent domains, which are sometimes referred to herein as layers. For example, SEC techniques can operate in an exposure layer to reduce multi-camera interference by reducing the likelihood that multi-camera interference will occur which can reduce a DC component of multi-camera interference. In such an example, other techniques may or may not be applied in a depth coding layer to reduce multi-camera interference by reducing the likelihood that two cameras use the same modulation/demodulation scheme to estimate depths in a scene which can reduce an AC component of multi-camera interference. Existing approaches to reduce multi-camera interference operate exclusively in the depth coding layer, and change the coding functions used to estimate depths at nanosecond time scales. The mechanisms described herein can be used to implement SEC techniques in the exposure coding layer by modulating the camera and source at micro/millisecond time scales.

Turning to FIG. 1, an example 100 of a system for continuous wave time-of-flight imaging is shown in accordance with some embodiments of the disclosed subject matter. As shown, system 100 can include a light source 102;

an image sensor 104; optics 106 (which can include, for example, a lens, a filter, etc.); a processor 108 for controlling operations of system 100 which can include any suitable hardware processor (e.g., a microprocessor, digital signal processor, a microcontroller, an image processor, a GPU, etc.) or combination of hardware processors; an input device 110 (such as a shutter button, a menu button, a microphone, a touchscreen, a etc.) for accepting input from a user and/or from the environment; memory 112; a signal generator 114 for generating one or more modulation and/or demodulation signals; and a communication system or systems 116 for allowing communication between processor 108 and other devices, such as a smartphone, a wearable computer, a tablet computer, a laptop computer, a personal computer, a game console, a server, etc., via a communication link. In some embodiments, memory 112 can store pixel values output by image sensor 104, depth values calculated based on output from image sensor 104, etc. Memory 112 can include a storage device (e.g., flash memory, a hard disk, RAM, ROM, EEPROM, a Blu-ray disc, a Digital Video Disk, etc.) for storing a computer program for controlling processor 108. In some embodiments, memory 112 can include instructions for causing processor 108 to execute processes associated with the mechanisms described herein, such as processes described below in connection with FIGS. 7 and 8.

In some embodiments, light source 102 can be any suitable light source that can be configured to emit modulated light toward a scene 120 in accordance with a modulation signal (e.g., M(t)) received from signal generator 116. For example, light source 102 can include one or more laser diodes, one or more lasers that are defocused using a concave lens, one or more light emitting diodes, and/or any other suitable light source. In some embodiments, light source 102 can emit light at any suitable wavelength. For example, light source 102 can emit visible light, near-infrared light, infrared light, etc. In a more particular example, light source 102 can be a laser diode that emits light centered around 830 nm that can be modulated using any suitable signal. In a yet more particular example, light source 102 can be an L830P200 laser diode (available from Thorlabs, Inc., headquartered in Newton, N.J.) that can be modulated with arbitrary waveforms by an external signal of up to 500 MHz bandwidth. In another more particular example, light source 102 can be a laser diode that emits light centered around 850 nm that can be modulated using any suitable signal, such as an L850P200 laser diode (available from Thorlabs, Inc.) that can be modulated with arbitrary waveforms by an external signal of up to 500 MHz bandwidth.

In some embodiments, image sensor 104 can be any suitable image sensor that can receive modulated light reflected by scene 120 and, using a demodulation signal (e.g., D(t)) from signal generator 114, generate signals that are indicative of the time elapsed from when the modulated light was emitted by light source 102 until it reached image sensor 104 after being reflected by scene 120. Any suitable technique or combination of techniques can be used to generate signals based on the demodulation signal received from signal generator 116. For example, the demodulation signal can be an input to a variable gain amplifier associated with each pixel, such that the output of the pixel is based on the value of the demodulation signal when the modulated light was received (e.g., by amplifying the signal produced by the photodiode). As another example, the demodulation signal can be used as an electronic shutter signal that controls an operational state of each pixel. As yet another example, the demodulation signal can be used as an input and/or control signal for a comparator associated with each pixel that compares the signal generated by a photodiode in the pixel to a threshold, and outputs a binary signal based on the comparison. As still another example, the demodulation signal can be used to control an optical shutter. In such an example, the optical shutter can be a global shutter and/or a shutter associated with individual pixels or groups of pixels (e.g., an LCD shutter). Note that in some embodiments, light source 102 and image sensor 104 can be co-located (e.g., using a beam splitter or other suitable optics).

In some embodiments, optics 106 can include optics for focusing light received from scene 120, one or more narrow bandpass filters centered around the wavelength of light emitted by light source 102, any other suitable optics, and/or any suitable combination thereof. In some embodiments, a single filter can be used for the entire area of image sensor 104 and/or multiple filters can be used that are each associated with a smaller area of image sensor 104 (e.g., with individual pixels or groups of pixels).

In some embodiments, a depth estimate can be based on signals read out from image sensor 104 serially and/or in parallel. For example, if a coding scheme uses three demodulation function, image sensor 104 can use a single pixel to successively generate a first value based on the first demodulation function at a first time, a second value based on the second demodulation function at a second time that follows the first time, and a third value based on the third demodulation signal at a third time that follows the second time. As another example, image sensor 104 can use multiple sub pixels to simultaneously generate a first value by applying the first demodulation function to a first sub-pixel at a first time, a second value by applying the second demodulation function to a second sub-pixel at the first time, and a third value by applying the third demodulation function to a third sub-pixel at the first time.

In some embodiments, signal generator 114 can be one or more signal generators that can generate signals to control light source 102 using a modulation signal and provide demodulation signals for the image sensor. In some embodiments, as described below, signal generator 114 can generate two different types of signals (e.g., an impulse train and a sinusoid wave), that are synchronized (e.g., using a common clock signal). Although a single signal generator is shown in FIG. 1, any suitable number of signal generators can be used in some embodiments. Additionally, in some embodiments, signal generator 114 can be implemented using any suitable number of specialized analog circuits each configured to output a signal that can be used to implement a particular coding scheme. In some embodiments, one or more of the demodulation signals D(t) can be a phase shifted version of the modulation signal M(t).

In some embodiments, system 100 can communicate with a remote device over a network using communication system(s) 116 and a communication link. Additionally or alternatively, system 100 can be included as part of another device, such as a smartphone, a tablet computer, a laptop computer, an automobile, etc. Parts of system 100 can be shared with a device within which system 100 is integrated. For example, if system 100 is integrated with a smartphone, processor 108 can be a processor of the smartphone and can be used to control operation of system 100.

In some embodiments, system 100 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, security camera, outdoor monitoring system, a smartphone, a wearable computer, a tablet computer, an automobile, a personal data assistant (PDA), a personal computer, a laptop computer, a multimedia terminal, a game console or peripheral for a gaming counsel or any of the above devices, a special purpose device, etc.

Communications by communication system 116 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 100 and another device, such as a network link, a dial-up link, a wireless link, a hard-wired link, any other suitable communication link, or any suitable combination of such links. System 100 and/or another device (e.g., a server, a personal computer, a smartphone, etc.) can enable a user to execute a computer program uses information derived using the mechanisms described herein to, for example, control a user interface.

It should also be noted that data received through the communication link or any other communication link(s) can be received from any suitable source. In some embodiments, processor 108 can send and receive data through the communication link or any other communication link(s) using, for example, a transmitter, receiver, transmitter/receiver, transceiver, or any other suitable communication device.

FIG. 2A shows an example of depth information that can be recovered using a conventional continuous wave time-of-flight camera in the absence of other continuous wave time-of-flight light cameras. In general, the intensity of a light source (e.g., light source 102) of a C-ToF camera can be temporally modulated as a periodic function M(t), (M(t)≥0) with a period $T_0$. Light emitted by the source can travel to a scene, and can be reflected back toward the camera. The radiance of the reflected light incident on a sensor pixel p can be modeled as a time-shifted and scaled version of M(t):

$$R(p; t) = \alpha P_s M\left(t - \frac{2d}{c}\right), \quad (1)$$

where d is the distance between the camera and a scene point imaged at p, c is the speed of light, $P_s$ is average power of the light source with an assumption of $1/T_0 \int_{T_0} M(t)dt=1$, and $\alpha$ is a scene-dependent scale factor that accounts for scene albedo, reflectance properties and light fall-off. The camera can estimate a correlation between R(p; t) and a periodic demodulation function, such as D(t) (0≤D(t)≤1) or D(t) (−1≤D(t)≤1) with the same frequency as M(t). Note that in general, mechanisms described herein are described based on a unipolar demodulation function(s) D(t) (0≤D(t)≤1), however this is merely an example and results and analysis can be generalized, such as to a bipolar demodulation function D(t) (−1≤D(t)≤1). The intensity value C(p; d) measured at pixel p can be represented as the correlation between R(p; t) and D(t):

$$C(p;d) = s\int_T (R(t;d) + P_a) D(t) dt, \quad (2)$$

where s is a camera-dependent scale factor encapsulating sensor gain and sensitivity, T is the total integration time, and $P_a$ is average power of ambient light incident on the scene (e.g., due to sunlight in outdoor operation). In order to estimate scene depths, several (e.g., ≥3) different C(p; d) values are generally measured using different pairs of modulation and demodulation functions. Note that in some embodiments, all three values can be measured simultaneously. As shown in FIG. 2A, due to the lack of other light sources that cause interference, intensities detected by the camera can be entirely attributed to the light source associated with the camera.

FIG. 2B shows an example of AC noise and DC noise caused by the presence of multiple conventional continuous wave time-of-flight cameras using the same coding scheme. In particular, FIG. 2B depicts interference that can be caused when multiple C-ToF cameras that use the same modulation scheme simultaneously illuminate and image a scene point. The total intensity measured by one of the cameras (referred to as the primary camera) can be represented as:

$$C_{mult}(d) = C(d) + \underbrace{\sum_{n=1}^{N} C_n(d)}_{multi-camera\ interference}, \quad (3)$$

where N is the number of interfering cameras, C(d) is the intensity measured by the primary camera due to its own source which is described above in connection with EQ. (2), and $C_n(d) = s\int_T R_n(t)D(t)dt$ is the measured intensity due to the $n^{th}$ source. $R_n(t)$ is the radiance received by the primary camera due to light emitted by the $n^{th}$ source. Note that for the designation "primary camera" is used for ease of explanation, and the $n^{th}$ camera would also be the primary camera if the example were described from its perspective. Note that the argument p is omitted for brevity. As shown in EQ. (3), the summation term alters the true correlation value C(d), thus resulting in erroneous depth estimates.

In a particular example involving C-ToF cameras that use sinusoid coding, both modulation M(t) and demodulation D(t) functions can be implemented as sinusoids of the same frequency. In such an example, the camera can perform K≥3 intensity measurements. Each measurement $C^k(d)$, k∈{1, ..., K} can be generated by shifting the demodulation function D(t) by a different amount $\psi_k$, while M(t) remains fixed. For example, if K=4, the shifts can be defined as $[\psi_1, \psi_2, \psi_3, \psi_4] = [0, \pi/2, \pi, 3\pi/2]$. The set of measurements $\{C^k(d)\}$, k∈{1, ..., K} can be defined as the measurement waveform. If $\phi$ is used to represent the phase of the measurement waveform sinusoid, scene depth d is proportional to $\phi$, and can be recovered by simple, analytic expression. However, when multiple cameras are simultaneously imaging a scene point, each camera receives light from its own source, as well as the interfering sources. Assuming all the sources use sinusoids of the same frequency, the intensities $\{C_n^k\}$, k∈{1, ..., K} measured by the camera due to the $n^{th}$ source also form a sinusoid as shown in FIG. 2B. The total measurement waveform $\{C_{mult}^k\}$, k∈{1, ..., K} can be represented as the sum of the individual sinusoids, and thus, also forms a sinusoid. However, since the phases $\phi_n$ of the individual sinusoids (one due to each interfering source) may be different, the phase of the total measurement waveform may differ from the true phase, resulting in systematic, and potentially large depth errors.

FIG. 2C shows an example of DC noise caused by the presence of multiple conventional continuous wave time-of-flight cameras using different coding schemes. As shown in FIG. 2C, the intensities $\{C_n^k\}$, $k \in \{1, \ldots, K\}$ due to an interfering source can be made to form a constant waveform, (e.g., $C_n^k = C_n$, $\forall k$), which does not affect the phase of the total measured waveform. For example, in sinusoid coding, this can be achieved by assigning a different modulation frequency to each camera within a range of potential modulation frequencies, as sinusoids of different frequencies are generally orthogonal function, in that the correlation between two sinusoids of different frequency have a correlation of zero, or a constant if the sinusoids have a non-zero DC offset. As a result, the total measurement waveform $\{C_{mult}^k\}$, $k \in [1, \ldots, K]$ has the same phase as the sinusoid due to the primary source, as the interfering components are constant waveforms. Accordingly, the interfering waveforms can mitigate systematic depth errors caused by AC interference.

This technique can be referred to as an AC-Orthogonal (ACO) coding scheme, as it can reduce the interference to constant waveforms by removing the AC component. However, the offset of the total waveform still increases, as shown in FIG. 2C, and the extra offset can act as additional ambient light. This can lower the SNR of the estimated depths due to increased shot noise. Note that with bipolar demodulation functions, although the DC-offset is removed, the shot noise still increases, as described in more detail in Appendix A, which is hereby incorporated herein by reference. For example, the depth standard deviation for a 4-tap (i.e., K=4) sinusoid-based ACO coding scheme can be represented as:

$$\sigma_{ACO} = \frac{c}{2\sqrt{2}\pi f_0 \sqrt{T}} \frac{\sqrt{e_s + e_a + Ne_i}}{e_s}, \quad (4)$$

where $f_0$ is the modulation frequency, T is the total capture time for each measurement, and c is the speed of light. $e_s = s\alpha P_s$, $e_i = s\alpha_i P_s$, and $e_a = sP_s$ are the average number of signal photons (due to the primary camera's own source), interfering photons (due to an interfering source), and ambient photons (due to ambient source), respectively, incident on the pixel per unit time. EQ. (4) is based on the assumption that $e_i$ is the same for all interfering cameras. As shown in EQ. (4), although an ACO coding scheme can mitigate systematic errors due to multi-camera interference, random errors due to photon noise increase as the number of interfering cameras increases. Each interfering source has a non-zero DC component, contributing additional photon noise to the intensity measurements.

FIG. 2D shows an example of depth information that can be recovered using a continuous wave time-of-flight camera in the presence of other continuous wave time-of-flight light cameras implemented in accordance with some embodiments of the disclosed subject matter. As described below in connection with FIG. 3, stochastically varying the emission timing of each camera can mitigate both AC and DC components of interference, by decreasing the likelihood that any two C-ToF cameras will emit light at the same time.

FIG. 3 shows an example of emission timing of multiple continuous wave time-of-flight cameras implementing stochastic exposure coding in accordance with some embodiments of the disclosed subject matter. In some embodiments, the mechanisms described herein can be used to implement a SEC scheme as a DC-orthogonal approach since that can mitigate both DC and AC interference. For example, if multiple C-ToF cameras are simultaneously imaging the same scene, one technique for mitigating interference is to divide the capture time into multiple slots, and ensure that exactly one camera (and its source) is on during any given slot. However, assigning cameras to slots deterministically requires temporal synchronization, which is infeasible in many uncontrolled consumer imaging applications. In some embodiments, each slot can have any suitable duration. For example, each slot can have a duration in a range of 0.5 milliseconds (ms) to 1 ms.

In some embodiments, the mechanisms described herein can assign slots in each camera independently and stochastically, which can mitigate interference without explicit synchronization. For example, in each slot, every camera can be turned on with a probability p. In such an example, each on-off decision can be made independently for each slot, for every camera, without any explicit synchronization. If only one camera that is present is emitting light during a particular slot, a clash is not produced and both DC and AC interference are avoided, because the camera receives light only from its own source, as shown by Slot 1 for ToF Camera1, and Slot 2 for ToF Camera 2 in FIG. 3. However, if multiple cameras are emitting light during a particular slot, a clash can occur in which AC and/or DC interference occurs, as shown in Slot M. As described below in connection with 710 and 712 of FIG. 7, interference from clashes that occur can be mitigated The performance of SEC techniques described herein can be dependent on the slot on probability $P_{ON}$ (hereafter expressed as p). As described above, as p increases, each camera utilizes a larger fraction of the capture time, but clashes are more likely to occur holding all else the same. On the other hand, as p decreases, clashes are less likely to occur, but the camera also utilize a smaller fraction of the total exposure time during which they are neither emitting light, nor capturing measurements, leading to a lower overall signal-to-noise ratio.

The performance of a C-ToF camera can be evaluated based on a depth standard deviation. For example, the depth standard deviation of a camera can be calculated based on different assumptions about the scene, the number of C-ToF cameras imaging the scene, and the coding scheme implemented by each camera. In such an example, it can be assumed that a scene is being imaged by N+1 C-ToF cameras. For ease of analysis, it can be assumed that the cameras are identical. The capture time of each camera can be divided into slots of the same duration, such that for each camera, the light source and image sensor are turned on with a probability p in every slot (note that in some embodiments the image sensor may continue to capture data regardless of whether the source is on and the data can be used to determine whether other cameras are present or can be unused). In general, the boundaries of the slots are unlikely to be aligned across cameras. Therefore, any given slot of a camera can be assumed to overlap with two slots of any other camera. The probability, $p_{noclsh}$, that any particular slot does not produce a clash (e.g., because only a single C-ToF camera is active during that slot) can be represented as:

$$p_{noclsh} = p(1-p)^{2N}, \quad (5)$$

Assuming that all of the non-clash slots can be identified, the effective exposure time for each camera, on average, can be represented as $Tp_{noclsh}$, where T is the total capture time, resulting in a reduced total exposure time for any given capture time T. In some embodiments, the peak power of the source can be amplified to compensate for the reduced exposure time. For example, if A represents the source peak power amplification, A can be set to 1/p, so the total energy used during the capture time remains constant. However, in practice A is limited by device constraints. Accordingly, the peak power amplification can be set such that $A=\min(1/p, A_0)$, where $A_0$ is the upper bound of A determined by device constraints.

Given an effective exposure time $Tp_{noclsh}$ and source peak power amplification A, the depth standard deviation of an SEC scheme can be derived from EQ. (4), and can be represented as:

$$\sigma_{SEC} = \frac{c}{2\sqrt{2}\pi f_0 \sqrt{Tp_{noclsh}}} \frac{\sqrt{Ae_s + e_a}}{Ae_s}, \quad (6)$$

where $A=\min(1/p, A_0)$ and $p_{noclsh}=p(1-p)^{2N}$. As described in Appendix A, optimal slot ON probability, $p_{SEC}$, for an SEC scheme can be represented as:

$$p_{SEC} = \underset{p}{\arg\min}\sigma_{SEC} = \min\left(\frac{1}{2N+1}, \frac{1}{A_0}\right) \quad (7)$$

Note that EQ. (7) indicates that as the number of interfering cameras N increases, the optimal ON probability decreases, which can insure that a relatively low level of clashes is maintained. As p moves away from $p_{SEC}$, the optimal SNR cannot be achieved because the effective integration time is reduced (e.g., due to a lower probability of turning on the source, or a higher probability of clashes). In some embodiments, a camera can attempt to determine the number of interfering cameras N by capturing an image without illumination from the cameras source (e.g., with light source 102 off), and comparing the total intensity measured in that image to the total intensity measured when the light source is used. In such embodiments, the difference between the two signals can be used to estimate the total number of interfering cameras N.

In some embodiments, the mechanisms described herein can use one or more techniques to determine whether another C-ToF camera is present and/or whether light from another C-ToF camera is present in a particular slot. As SEC schemes are stochastic and asynchronized, a fraction of the slots in each frame may still have clashes when multiple cameras are present. For example, if two cameras happen to select overlapping slots in which to emit light, both cameras would experience a clash. In some embodiments, when utilizing an SEC scheme, such clash slots can be identified using any suitable techniques, and discarded so that they do not affect a depth estimate. For example, in some embodiments, the mechanisms can determine, for each slot, total intensity (and/or a proxy for total intensity), and slots with total intensity that is greater than a threshold can be discarded as it can be inferred that the camera received light from at least one additional (e.g., interfering) source. In such an example, the total received intensity in slots in which a clash has occurred is higher compared to no-clash slots, with high probability. In a more particular example, the correlation value $C_k$ for each correlation function k captured in a particular slot can be summed, such that $o=\Sigma_k C_k$, which can be compared to a threshold. If o is larger than the threshold, data from the corresponding slot can be discarded. In some embodiments, a depth value $d_m (m \in \{1, \ldots, M_{noclsh}\})$ can be estimated for each non-clash slot, and a final depth value d can be estimated for each frame by averaging $d_m$.

In some embodiments, the threshold can be any suitable value and can be determined using any suitable technique or combination of techniques. For example, the threshold can be determined based on a standard deviation of total intensity for the active slots in a frame. In a more particular example, the threshold can be set as the mean value of total intensity plus the standard deviation. Additional details related to determining the threshold are described in Appendix A. As another example, in some embodiments, the threshold can be determined by clustering the total intensity values for each of the active slots into at least two clusters, and setting the threshold based on the average value (e.g., a mean, a median, or a mode) of the lowest intensity cluster (e.g., by multiplying the average value by a coefficient). In a more particular example, the threshold can be set at 1.33 to 2 times the average value. In another more particular example, the threshold can be set to 1.5 times the average value. As yet another more particular example, active slots that are not clustered in the lowest intensity cluster can be excluded, and the threshold can be omitted.

Figure 4A:
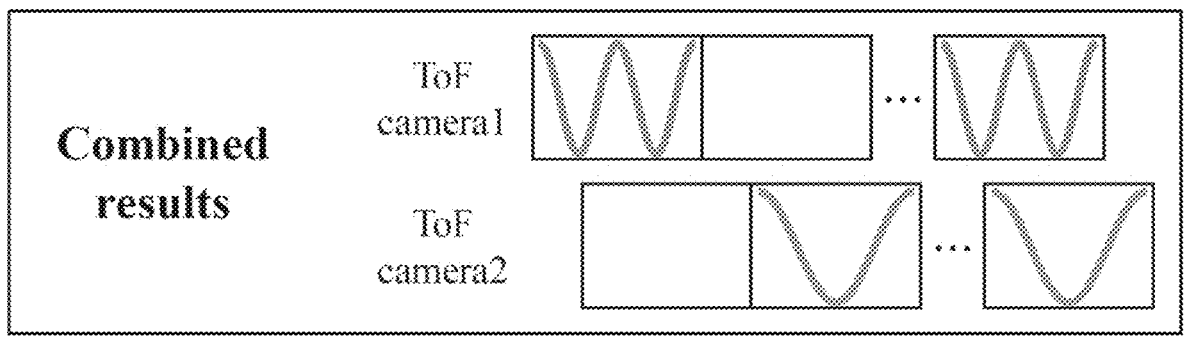
FIG. 4A shows an example of emission timing of multiple continuous wave time-of-flight cameras implementing stochastic exposure coding and different depth coding schemes in accordance with some embodiments of the disclosed subject matter.

FIG. 4A shows an example of emission timing of multiple continuous wave time-of-flight cameras implementing stochastic exposure coding and different depth coding schemes in accordance with some embodiments of the disclosed subject matter.

Figure 4B:
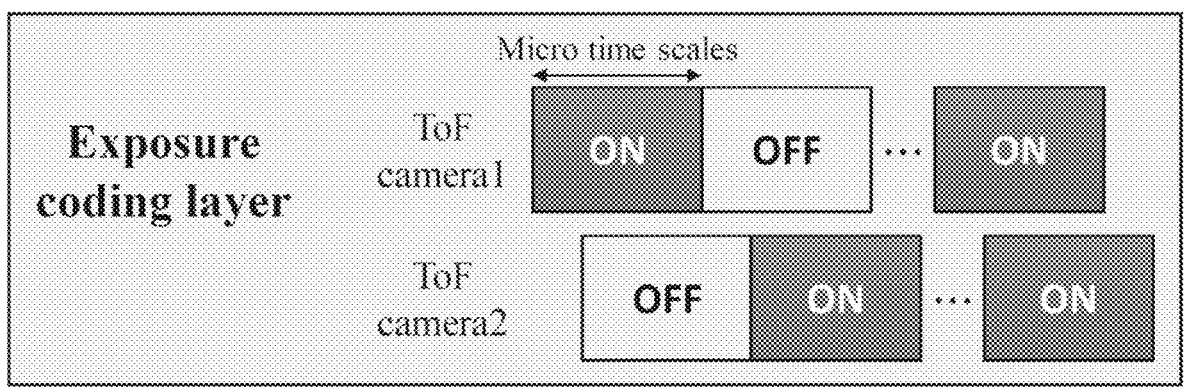
FIG. 4B shows an example of different emission timings of multiple continuous wave time-of-flight cameras selected using a stochastic exposure coding scheme implemented in accordance with some embodiments of the disclosed subject matter.

FIG. 4B shows an example of different emission timings of multiple continuous wave time-of-flight cameras selected using a stochastic exposure coding scheme implemented in accordance with some embodiments of the disclosed subject matter.

Figure 4C:
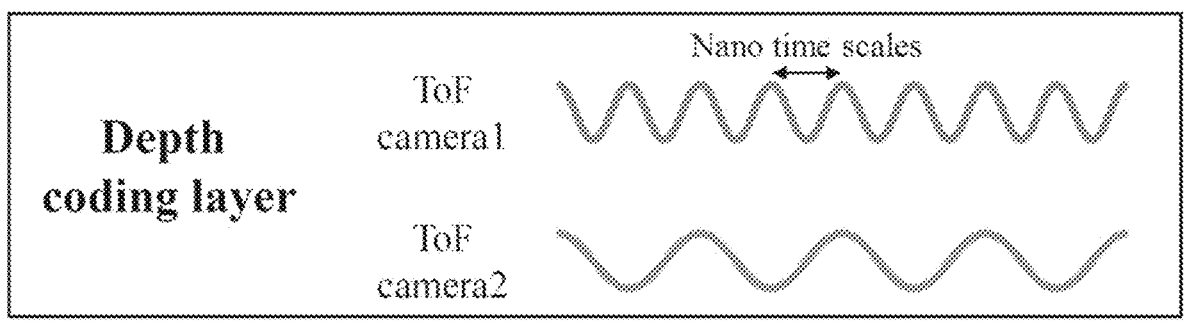
FIG. 4C shows an example of different depth coding schemes implemented by multiple continuous wave time-of-flight cameras that can be used in combination with a stochastic exposure coding scheme implemented in accordance with some embodiments of the disclosed subject matter.

FIG. 4C shows an example of different depth coding schemes implemented by multiple continuous wave time-of-flight cameras that can be used in combination with a stochastic exposure coding scheme implemented in accordance with some embodiments of the disclosed subject matter.

As shown in FIGS. 4A to 4C, the mechanisms described herein can use techniques in different C-ToF camera coding layers to mitigate multi-camera interference. As described above, existing approaches for multi-camera interference mitigation operate in the depth coding layer represented by FIG. 4C, as such approaches generally change the camera's coding functions at nanosecond time scales (e.g., by changing a frequency of the modulation and/or demodulation functions). In contrast, an SEC scheme can operate at a higher exposure coding layer by modulating the camera and source at micro/millisecond time scales. In some embodiments, because SEC and conventional ACO techniques operate in different layers, the techniques are effectively orthogonal to each other, and can be used in a complementary manner to achieve results that are superior to using either technique in isolation. For example, sinusoid coding with different modulation frequencies can be used by different C-ToF cameras, while also using an SEC scheme to determine when each camera is in an ON state. In such a multi-layer integrated approach (sometimes referred to as multi-layer coding (CMB)), information detected in clashed slots can be used, since clashes can be assumed to not introduce systematic depth errors (e.g., clashes may still produce an increase in total intensity and therefore an increase in noise such as shot noise). In some embodiments, a CMB scheme can be implemented, in which repeated clash checks are unnecessary, which can lead to simpler depth estimations and an efficient frame structure.

A depth standard deviation, $\sigma_{CMB}$, of a CMB scheme can be derived from EQ. (4), and can be represented as:

$$\sigma_{CMB} = \frac{c}{2\sqrt{2}\pi f_0 \sqrt{Tp}} \frac{\sqrt{Ae_s + e_a + NpAe_i}}{Ae_s}, \qquad (8)$$

where $A=\min(1/p, A_0)$. Optimal slot ON probability, $p_{CMB}$, for a CMB scheme can be represented as p minimizing EQ. (8):

$$p_{CMB} = \arg\min_{p} \sigma_{CMB} = \frac{1}{A_0}, \qquad (9)$$

Note that $p_{CMB}$ is independent of N. Further description related to EQS. (8) and (9) is included in Appendix A.

Figure 5:
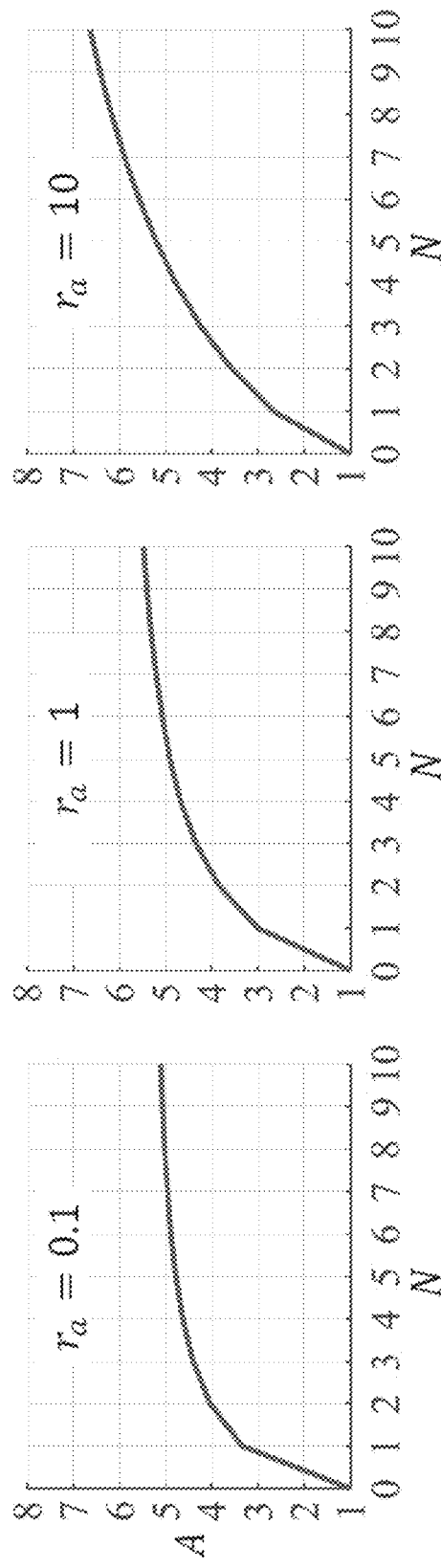
FIG. 5 shows an example of source peak power (A) that can be used to maintain a relatively consistent level of depth error using stochastic exposure coding techniques described herein as the number of interfering continuous wave time-of-flight cameras (N) increases for various relative ambient light strengths ($r_a$).

FIG. 5 shows an example of source peak power (A) that can be used to maintain a relatively consistent level of depth error using stochastic exposure coding techniques described herein as the number of interfering continuous wave time-of-flight cameras (N) increases for various relative ambient light strengths ($r_a$). As the effective integration time for an SEC scheme is shorter than for an ACO scheme with the same total integration time, the SNR of an SEC scheme can be smaller (i.e., noisier) than an ACO scheme if the source peak power amplification A is not sufficiently large. A theoretical A required for an SEC scheme to perform better than an ACO scheme in terms of SNR, all else being equal, can be estimated from $\sigma_{SEC} \leq \sigma_{ACO}$ as:

$$\frac{1}{\sqrt{p_{noclsh}}} \frac{\sqrt{A + r_a}}{A} \leq \sqrt{1 + r_a + Nr_i}, \qquad (10)$$

where $r_a = e_a/e_s$ and $r_i = e_d/e_s$ are relative ambient light strength and relative interfering light source strength, respectively. As shown in FIG. 5, although the required A increases with N, it eventually converges. Note that if the source peak power amplification of an SEC scheme is larger than (e+$\sqrt{e(e+2r_a r_i)}$)/$r_i$, the depth standard deviation of the SEC scheme is always lower than ACO regardless of the number of interfering cameras. For example, the required A≈6.3 when $r_a = r_i = 1$.

Figure 6:
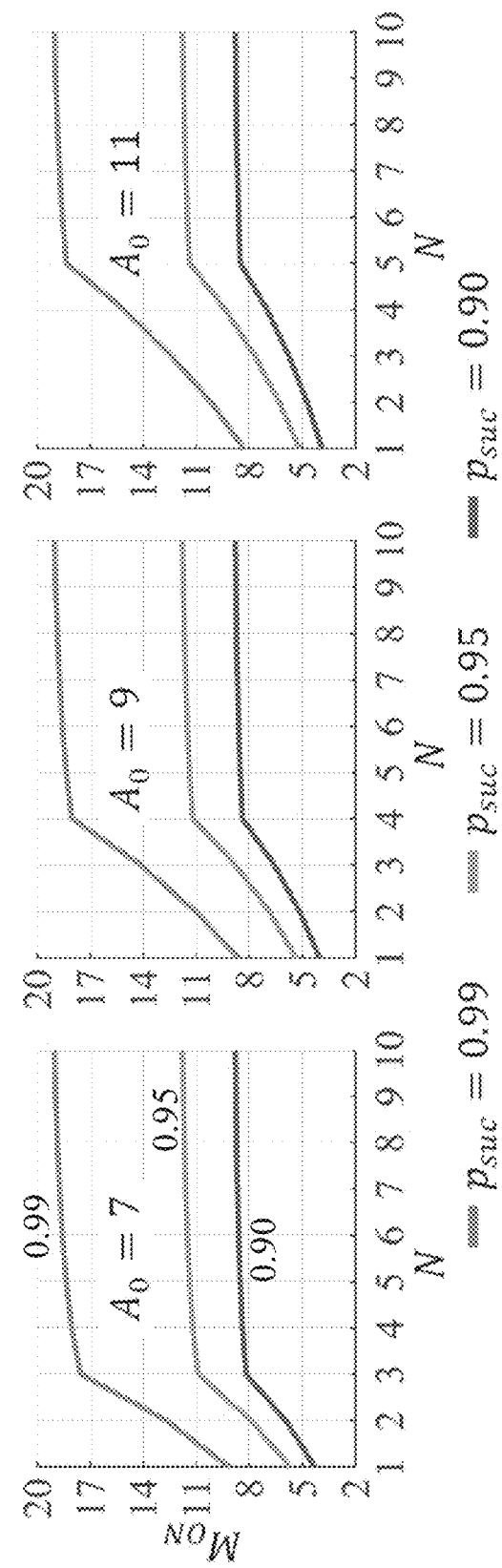
FIG. 6 shows an example of a number of ON slots ($M_{ON}$) that can be used to maintain a relatively consistent level of depth error using stochastic exposure coding techniques described herein as the number of interfering cameras (N) increases for various allowable source peak power amplification ($A_0$) and various desired success probabilities ($p_{suc}$).

FIG. 6 shows an example of a number of ON slots ($M_{ON}$) that can be used to maintain a relatively consistent level of depth error using stochastic exposure coding techniques described herein as the number of interfering cameras (N) increases for various allowable source peak power amplification ($A_0$) and various desired success probabilities ($p_{suc}$). In general, in an SEC scheme at least one non-clashed ON slot is generally required. If $p_{suc}$ is a probability of getting at least one non-clashed ON slots during a frame, a number of ON slots $M_{ON}$ that a camera would need to capture per frame increases generally increases with N, but eventually converges. For example, the required number of ON slots $M_{ON}$ can converge to $$e\left(\frac{z^2}{2} + 1 - z\sqrt{\frac{z^2}{4} + 1}\right)$$

regardless of the number of interfering cameras, where z is the z-score value, and is a function of $p_{suc}$. For example, when $p_{suc} = 0.9$, the required $M_{ON}$ is upper bounded by 9.1.

Figure 7:
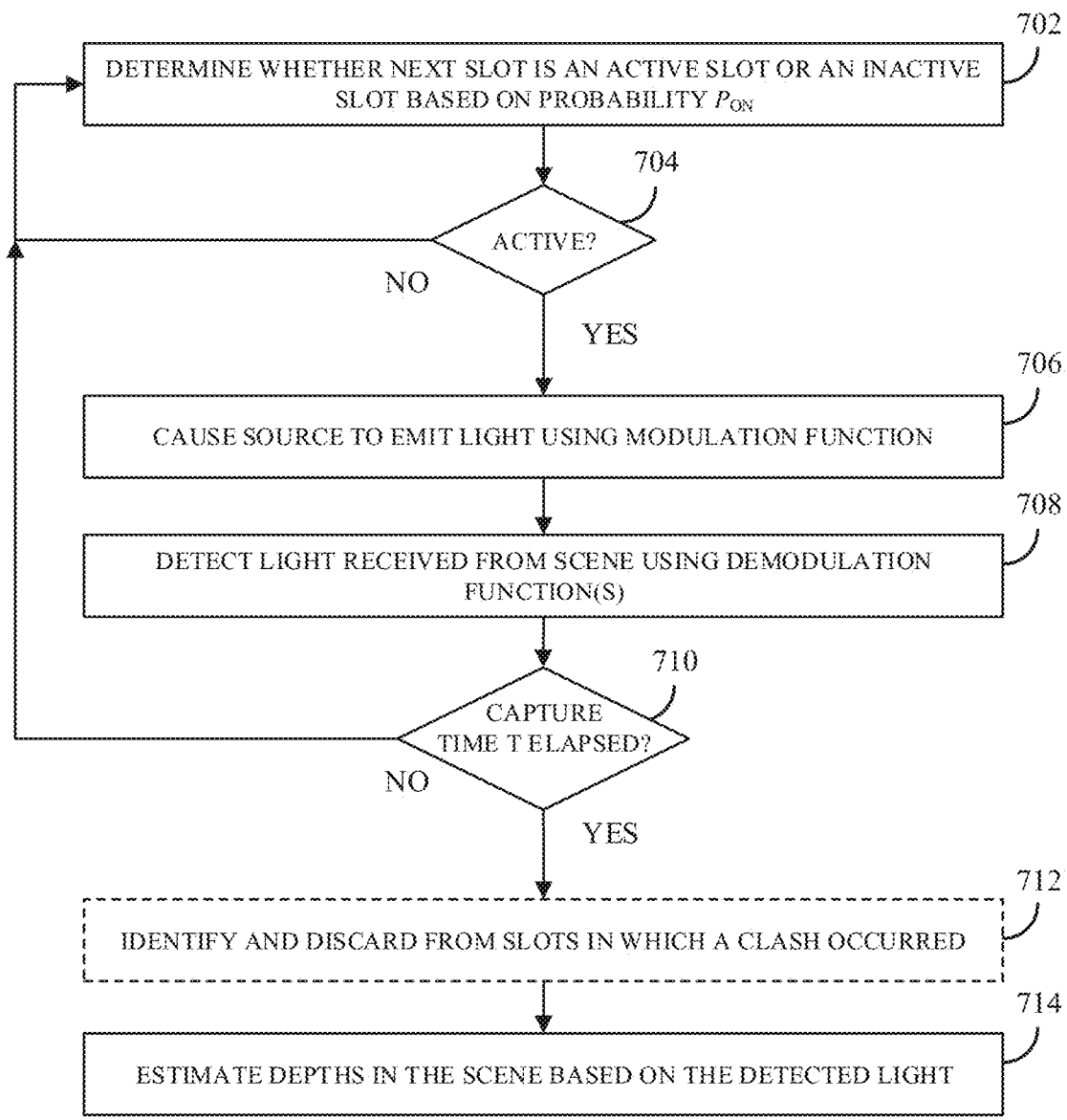
FIG. 7 shows an example 700 of a process for stochastic exposure coding that mitigates multi-camera interference in continuous wave time-of-flight imaging in accordance with some embodiments of the disclosed subject matter.

FIG. 7 shows an example 700 of a process for stochastic exposure coding that mitigates multi-camera interference in continuous wave time-of-flight imaging in accordance with some embodiments of the disclosed subject matter. At 702, process 700 can determine whether a next slot is to be an active slot or an inactive slot based on probability $p_{ON}$.

In some embodiments, the probability $p_{ON}$ can be any suitable value, and can be determined using any suitable technique or combination of techniques. For example, $p_{ON}$ can be determined using EQ. (7) if the device executing process 700 is associated with a camera that is implementing an SEC scheme. As another example, $p_{ON}$ can be determined using EQ. (9) if the device executing process 700 is associated with a camera that is implementing a CMB scheme. As still another example, $p_{ON}$ can be based on a desired probability of success $p_{suc}$, a number of ON slots $M_{ON}$ which converges as the number of interfering cameras N increases (e.g., as shown in FIG. 6), a time budget T, and the length of each slot. As yet another example, $p_{ON}$ can be predetermined.

In some embodiments, process 700 can determine whether an upcoming slot is to be an active slot or an inactive slot during an immediately preceding slot. For example, during a particular slot, process 700 can determine whether the upcoming slot is to be an active slot or an inactive slot using a random number generator and $p_{ON}$. Alternatively, in some embodiments, process 700 can determine, prior to a first slot of a frame, which of the slots are to be active for the upcoming frame using a random number generated for each slot and $p_{ON}$. Note that a random number generator is merely an example, and any other suitable stochastic process can be used to determine which slots are active slots and which slots are passive slots.

At 704, if process 700 determines that the next slot is to be an inactive slot ("NO" at 704), process 700 can return to 702 to determine whether the next slot is to be an active slot or an inactive slot. Otherwise, if process 700 determines that the next slot is to be an active slot ("YES" at 704), process 700 can move to 706.

At 706, process 700 can cause a source (e.g., light source 102) to emit modulated light toward a scene using a modulation function for the current slot. In some embodiments, the modulation function can have any suitable shape (e.g., a sinusoid, a square wave(s), a triangle wave(s), a trapezoid wave(s), an impulse, etc.), and can have any suitable frequency.

At 708, process 700 can detect light received from the scene using an image sensor (e.g., image sensor 104), and the values generated by the image sensor can be modulated and/or modified by one or more demodulation functions. In some embodiments, the demodulation function(s) can be applied using any suitable technique or combination of techniques. For example, a demodulation signal implementing the demodulation function can be an input to a variable gain amplifier associated with each pixel, such that the output of the pixel is based on the value of the demodulation signal when the modulated light was received (e.g., by amplifying the signal produced by the photodiode). As another example, the demodulation signal can be used as an electronic shutter signal that controls an operational state of each pixel. As yet another example, the demodulation signal can be used as an input and/or control signal for a comparator associated with each pixel that compares the signal generated by a photodiode in the pixel to a threshold, and outputs a binary signal based on the comparison. As still another example, the demodulation signal can be used to control an optical shutter. In such an example, the optical shutter can be a global shutter and/or a shutter associated with individual pixels or groups of pixels (e.g., an LCD shutter).

In some embodiments, process 700 can record the value generated at each pixel for the particular slot (e.g., in memory 112). For example, in some embodiments, process 700 can store the values generated by each pixel as a sub-image associated with a particular slot.

At 710, process 700 can determine whether a total capture time T associated with a current exposure has elapsed. If process 700 determines that T has not elapsed ("NO" at 710), process 700 can return to 702 to determine whether a next slot is to be an active slot or a non-active slot. In some embodiments, by looping through 702 to 710 until the capture time has elapsed, a subset of the slots that collectively span the capture time can be selected as active slots. Otherwise, if process 700 determines that T has elapsed ("YES" at 710), process 700 can move to 712.

At 712, process 700 can identify in which active slots, if any, a clash occurred due to interference from another C-ToF camera. In some embodiments, process 700 can use any suitable technique or combination of techniques to determine if a clash occurred in a particular slot. For example, as described above in connection with FIG. 3, process 700 can determine a total intensity detected for a particular slot. If the intensity is over a threshold, process 700 can discard the data associated with the slot. In some embodiments, 712 can be omitted from process 700. For example, if a device executing process 700 implements an SEC scheme, process 700 can determine, at 712, whether any clashes occurred. As another example, if a device executing process 700 implements a CMB scheme, process 700 can omit 712 as data from slots in which a clash occurred can still be used to determine depths in a scene.

At 714, process 700 can estimate depths in the scene being imaged based on the detected light from various slots. In some embodiments, process 700 can use any suitable technique or combination of techniques to estimate depths in the scene. For example, in some embodiments, a depth $d_m$ can be estimated for each pixel in each active slot based on the values recorded at 708. In some embodiments, process 700 can determine a depth d for each pixel can be estimated by averaging the depths $d_m$ across all slots.

Figure 8:
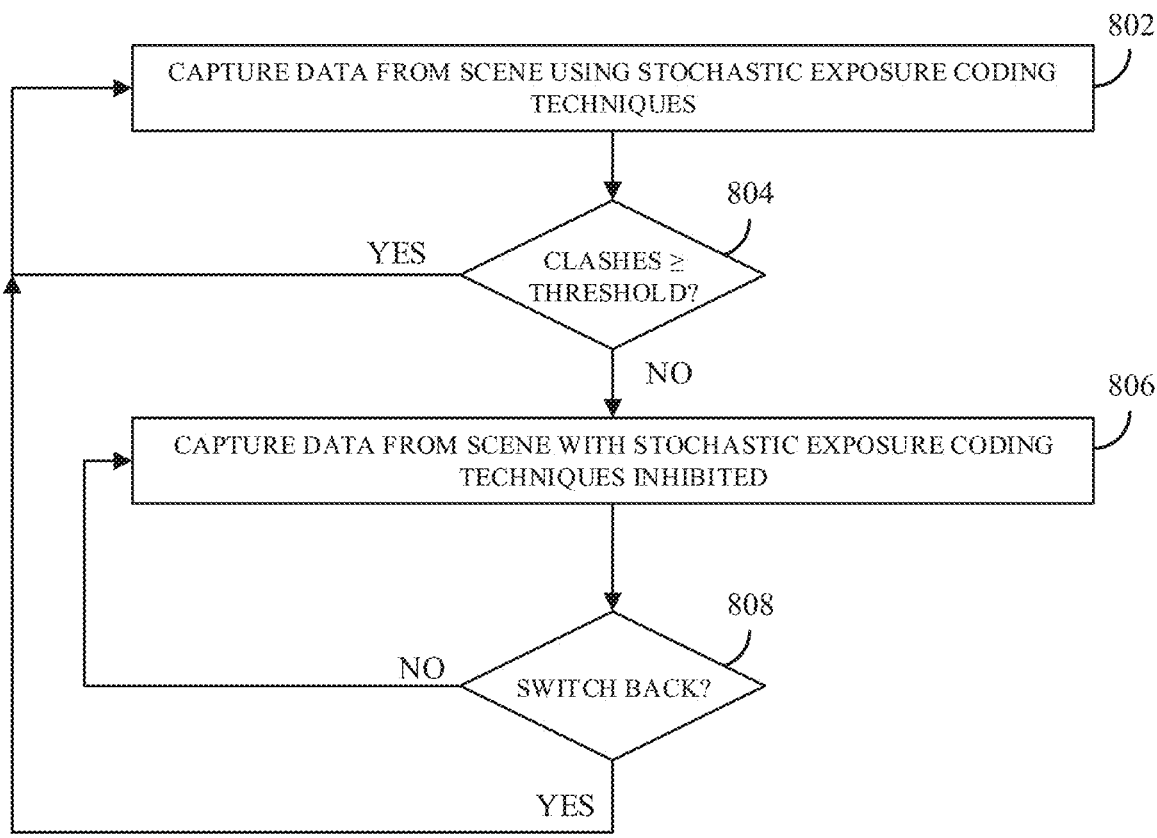
FIG. 8 shows an example 800 of a process for selectively switching between conventional continuous wave time-of-flight coding and stochastic exposure coding that mitigates multi-camera interference in continuous wave time-of-flight imaging in accordance with some embodiments of the disclosed subject matter.

FIG. 8 shows an example 800 of a process for selectively switching between conventional continuous wave time-of-flight exposure and stochastic exposure coding that mitigates multi-camera interference in continuous wave time-of-flight imaging in accordance with some embodiments of the disclosed subject matter. At 802, process 800 can capture data from a scene using stochastic exposure cording techniques, such as techniques described above in connection with FIGS. 3-7. For example, process 800 can capture data from the scene using an SEC scheme, or a CMB scheme.

At 804, process 800 can determine a percentage and/or a count of the number of slots in which a clash occurred in a previous frame, or a series of previous frames. If process 800 determines that the number of clashes is at or above a threshold level ("YES" at 804), process 800 can return to 802 and can continue to capture data from the scene using stochastic techniques. In some embodiments, process 800 can make one or more changes to the parameters of the stochastic coding, such as by adjusting $p_{ON}$, T, and/or A to achieve superior results.

Otherwise, if process 800 determines that the number of clashes is below the threshold ("NO" at 804), process 800 can move to 806. At 806, process 800 can capture data from the scene with stochastic coding features inhibited. For example, at 806, process 800 can switch to a conventional C-ToF coding scheme.

At 808, process 800 can determine whether a condition has been met to cause process 800 to switch back to a stochastic coding scheme. For example, in some embodiments, after a predetermined period of time and/or a predetermined number of frames has elapsed, process 800 can switch back to a stochastic coding scheme. As another example, process 800 can determine an intraframe standard deviation of depth values for a particular pixel(s), and if the standard deviation is greater than a threshold, process 800 can switch to a stochastic coding scheme. In a more particular example, process 800 can generate a depth estimate for each slot in the total exposure time for each of one or more pixels, and if the standard deviation of the depth estimates for at least a subset of the pixels is at or above a threshold process 800 can switch to a stochastic coding scheme. As yet another example, process 800 can determine whether there has been an interframe change in total intensity that is associated with multi-camera interference. In such an example, if the total intensity increases between frames, it may be an indication that another C-ToF camera has begun imaging the same scene.

If process 800 determines that a condition has been met ("YES" at 808), process 800 can return to 802 and capture data using a stochastic coding scheme. Otherwise, if process 800 determines that a condition has not been met ("NO" at 808), process 800 can return to 806.

Figure 9A:
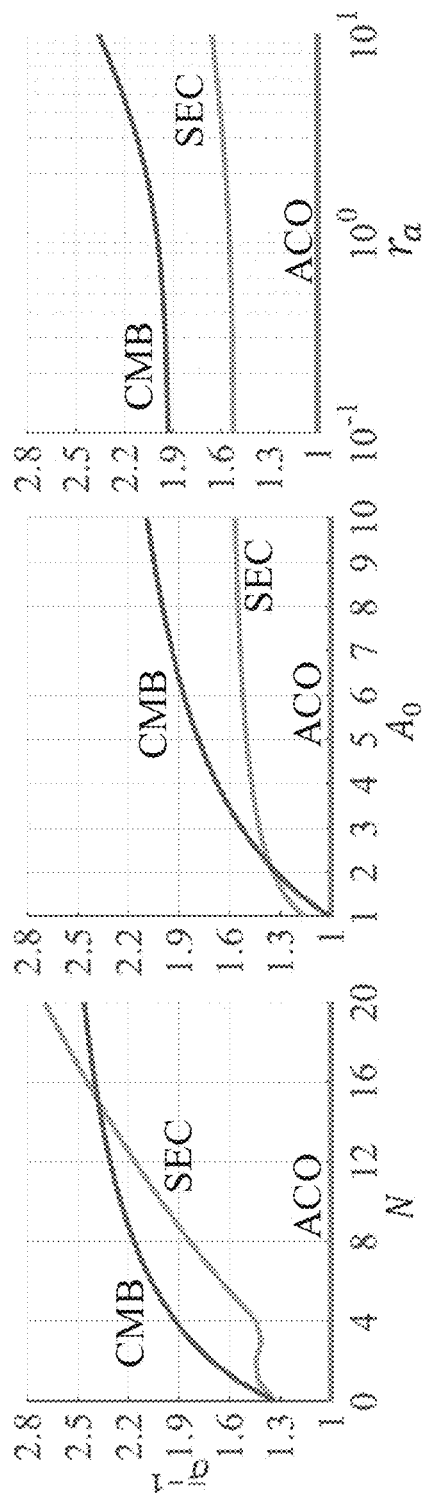
FIG. 9A shows examples of theoretic relative inverse depth standard deviation ($\overline{\sigma}^{-1}$) at the same energy consumption for various different continuous wave time-of-flight coding schemes for mitigating multi-camera interference including an AC-orthogonal coding (ACO) scheme, a stochastic exposure coding (SEC) scheme, and a multi-layer coding (CMB) scheme as various properties change including number of interfering cameras (N), source peak power amplification ($A_0$), and relative ambient light strengths ($r_a$).

FIG. 9A shows examples of theoretic relative inverse depth standard deviation ($\overline{\sigma}^{-1}$) at the same energy consumption for various different continuous-wave time-of-flight coding schemes for mitigating multi-camera interference including orthogonal AC depth coding (ACO), stochastic exposure coding (SEC), and multi-layer coding (CMB) as various properties change including number of interfering cameras (N), source peak power amplification ($A_0$), and relative ambient light strengths ($r_a$).

FIG. 9A shows theoretical comparisons between an ACO scheme, an SEC scheme, and a CMB scheme in terms of depth standard deviation at the same energy consumption. All comparisons are relative to an ideal ACO, such that ACO is always 1 by definition in FIG. 9A. Normalized inverse depth standard deviation $\overline{\sigma}^{-1}$ (higher value is associated with more accurate measurements) can be represented as:

$$\overline{\sigma}_{SEC}^{-1} = \frac{\sigma_{ACO}}{\sigma_{SEC}} = (1 - p_{SEC})^N \sqrt{\frac{A_0(1 + r_a + Nr_i)}{A_0 + r_a}}, \quad (11)$$

and $$\overline{\sigma}_{CMB}^{-1} = \frac{\sigma_{ACO}}{\sigma_{CMB}} = A_0 \sqrt{\frac{p_{CMB}(1 + r_a + Nr_i)}{A_0 + r_a + p_{CMB}NA_0r_i}}, \quad (12)$$

As shown in FIG. 9A, CMB generally outperforms SEC in most situations, and both schemes significantly outperform ACO.

Figure 9B:
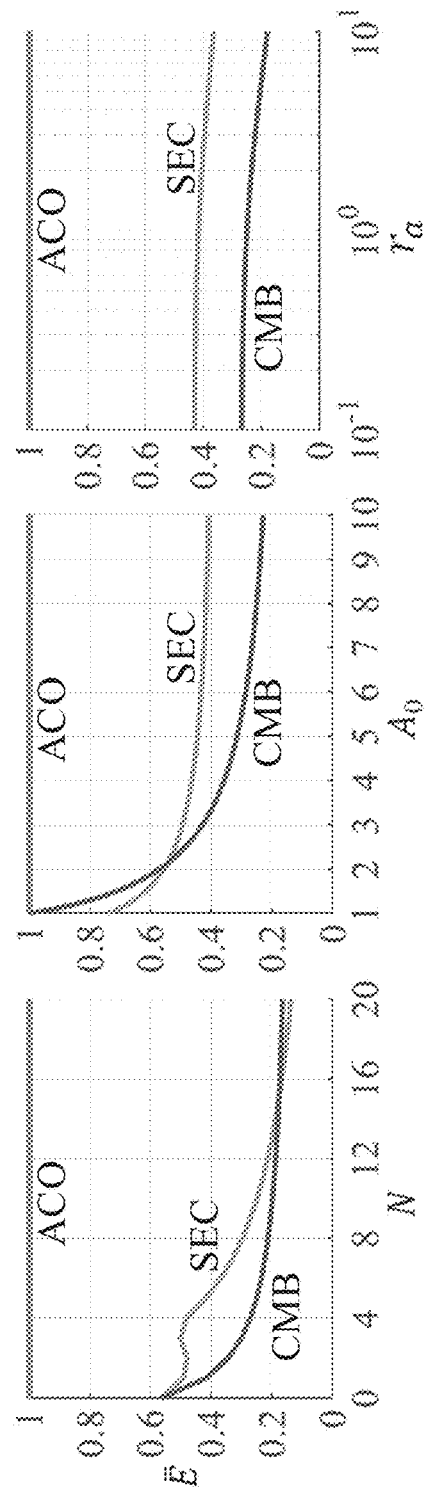
FIG. 9B shows examples of theoretic relative energy consumption (E) of various different continuous wave time-of-flight coding schemes for mitigating multi-camera interference including orthogonal AC depth coding (ACO), stochastic exposure coding (SEC), and multi-layer coding (CMB) as various properties change including number of interfering cameras (N), source peak power amplification ($A_0$), and relative ambient light strengths ($r_a$).

FIG. 9B shows examples of theoretic relative energy consumption (E) of various different continuous-wave time-of-flight coding schemes for mitigating multi-camera interference including orthogonal AC depth coding (ACO), stochastic exposure coding (SEC), and multi-layer coding (CMB) as various properties change including number of interfering cameras (N), source peak power amplification ($A_0$), and relative ambient light strengths ($r_a$). FIG. 9B shows the required energy consumption to achieve the same depth standard deviation, which can be represented as:

$$\overline{E}_{SEC} = \frac{E_{SEC}}{E_{ACO}} = \frac{1}{(1-p_{SEC})^{2N}} \frac{A_0 + r_a}{A_0(1+r_a+Nr_i)}, \quad (13)$$

and $$\overline{E}_{CMB} = \frac{E_{CMB}}{E_{ACO}} = \frac{A_0 + r_a + p_{CMB} N A_0 r_i}{A_0(1+r_a+Nr_i)}. \quad (14)$$

As shown in FIGS. 9A and 9B, $\overline{\sigma}^{-1}$ and $\overline{E}$ are compared for three coding schemes for mitigating multi-camera interference as a function of the number of interfering cameras N, allowable peak power amplification $A_0$, and ambient light strength $r_a$. When one of these parameters varies, the other parameters are fixed as N=5, $A_0$=8, $r_a$=1, and $r_i$=1. As can be seen from the FIGS. 9A and 9B, $\overline{\sigma}^{-1}$ and $\overline{E}$ are closely related to each other. In general, $\overline{\sigma}^{-1}$ and $\overline{E}$ of SEC and CMB improve when N increases due to DC interference reductions which cannot be achieved by ACO. Although the relative performance of SEC and CMB improves with $A_0$, it saturates for SEC. Note that both SEC and CMB provide savings in total energy consumption, all else being equal. Lower energy consumption is one of the key benefits of our approaches, which is critical in power-constrained applications.

Figures 10A, 10B, 10C:
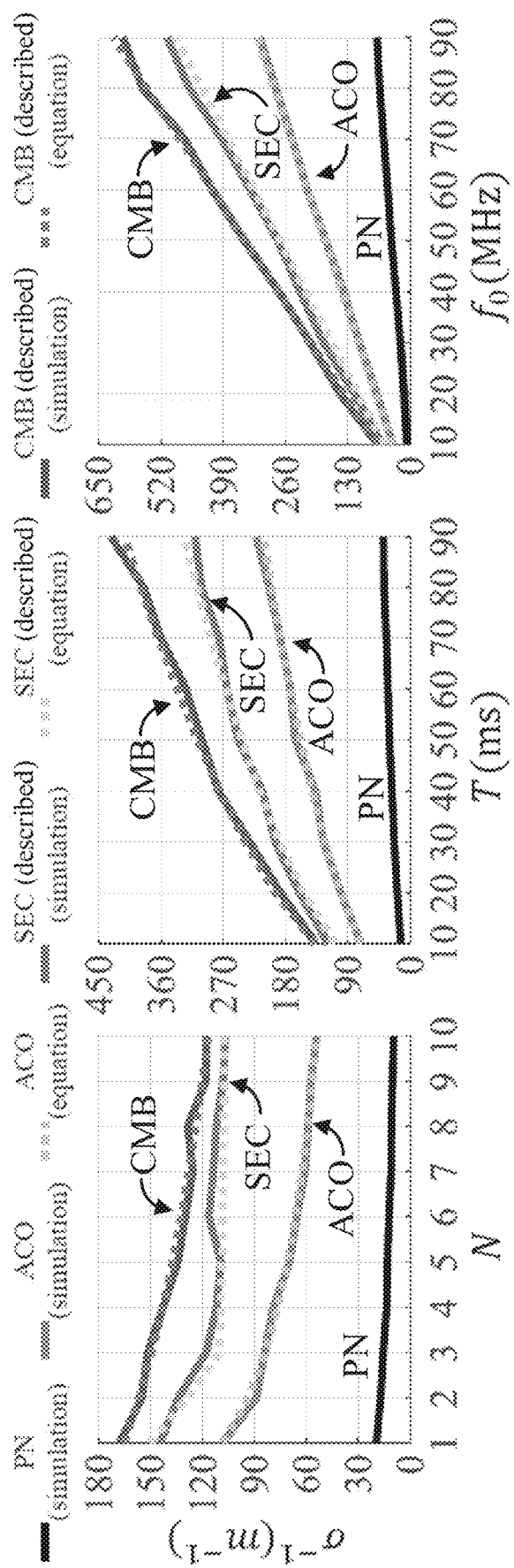
FIG. 10A shows examples of simulated and theoretic inverse depth standard deviation ($\sigma^{-1}(m^{-1})$) for various different continuous wave time-of-flight coding schemes for mitigating multi-camera interference including a pseudo-noise-based coding (PN) scheme, an orthogonal AC depth coding (ACO) scheme, a stochastic exposure coding (SEC) scheme, and a multi-layer coding (CMB) scheme as the number of interfering cameras (N) increases.
FIG. 10B shows examples of simulated and theoretic inverse depth standard deviation ($\sigma^{-1}(m^{-1})$) for various different continuous wave time-of-flight coding schemes for mitigating multi-camera interference including a pseudo-noise-based depth coding (PN) scheme, an orthogonal AC depth coding (ACO) scheme, a stochastic exposure coding (SEC) scheme, and multi-layer coding (CMB) scheme as the total capture time (T) increases.
FIG. 10C shows examples of simulated and theoretic inverse depth standard deviation ($\sigma^{-1}(m^{-1})$) for various different continuous wave time-of-flight coding schemes for mitigating multi-camera interference including a pseudo-noise-based depth coding (PN) scheme, an orthogonal AC depth coding (ACO) scheme, a stochastic exposure coding (SEC) scheme, and a multi-layer coding (CMB) scheme as the modulation frequency ($f_0$) increases.

FIG. 10A shows examples of simulated and theoretic inverse depth standard deviation ($\sigma^{-1}(m^{-1})$) for various different continuous-wave time-of-flight coding schemes for mitigating multi-camera interference including a pseudo-noise-based depth coding scheme (PN), an orthogonal AC depth coding (ACO), stochastic exposure coding (SEC), and multi-layer coding (CMB) as the number of interfering cameras (N) increases.

FIG. 10B shows examples of simulated and theoretic inverse depth standard deviation ($\sigma^{-1}(m^{-1})$) for various different continuous time-of-flight coding schemes including a pseudo-noise-based depth coding scheme (PN), an orthogonal AC depth coding (ACO), stochastic exposure coding (SEC), and multi-layer coding (CMB) as the total capture time (T) increases.

FIG. 10C shows examples of simulated and theoretic inverse depth standard deviation ($\sigma^{-1}(m^{-1})$) for various different continuous time-of-flight coding schemes including a pseudo-noise-based depth coding scheme (PN), an orthogonal AC depth coding (ACO), stochastic exposure coding (SEC), and multi-layer coding (CMB) as the modulation frequency ($f_0$) increases. Depth standard deviations of different approaches were simulated to confirm the derived depth standard deviation equations. For each approach, correlation values were computed, Poisson noise was added, and the depth value was estimated from the noisy correlation values. This procedure was repeated 1000 times to compute the depth standard deviations. In addition to ACO, SEC, and CMB, results of a PN-sequence approach (PN) are also shown. The original depth estimation algorithm for PN was modified to accommodate unipolar demodulation functions and four correlation values to insure a fairer comparison with the other approaches.

FIGS. 10A to 10C show the inverse depth standard deviations $\sigma^{-1}$ of four approaches, PN, ACO, SEC, and CMB over the number of interfering cameras N, total integration time T, and modulation frequency $f_0$ when the depth value is 1 m. Solid and dotted lines indicate the results by simulations and equations, respectively. All simulation results align fairly closely with the derived depth standard deviation equations. The poor performance of PN can be explained by non-zero AC interference removal and relatively low modulation frequency to achieve the same measurable depth range as other approaches. Additional details related to the results shown in FIGS. 10A to 10C are described in Appendix A.

FIGS. 11A to 11D show examples of 3D model reconstruction over different numbers of interfering cameras for a PN scheme, an ACO scheme, an SEC scheme, and a CMB scheme, respectively, and associated RMSE values in mm.

Given a 3-D model, depth values from a given camera position to all vertices of the model were computed. For each vertex, the correlation values were computed using four different approaches (PN, ACO, SEC, and CMB) considering all parameter values (e.g., $r_a$, N) relevant to specific interference situations, photon noise was added, and the depth value was estimated from the correlation values to which photon noise was added. After reconstruction of the model, RMSE was computed for an objective quality comparison. FIGS. 11A to 11D compare simulation results achieved using the different approaches over different number of interfering cameras N, with RMSE values (in mm) shown below the reconstructed model. Although absolute performance of all approaches decreases with N, the relative performance of SEC and CMB increases compared to PN or ACO in both objective and subjective quality for each value of N.

Figure 12A:
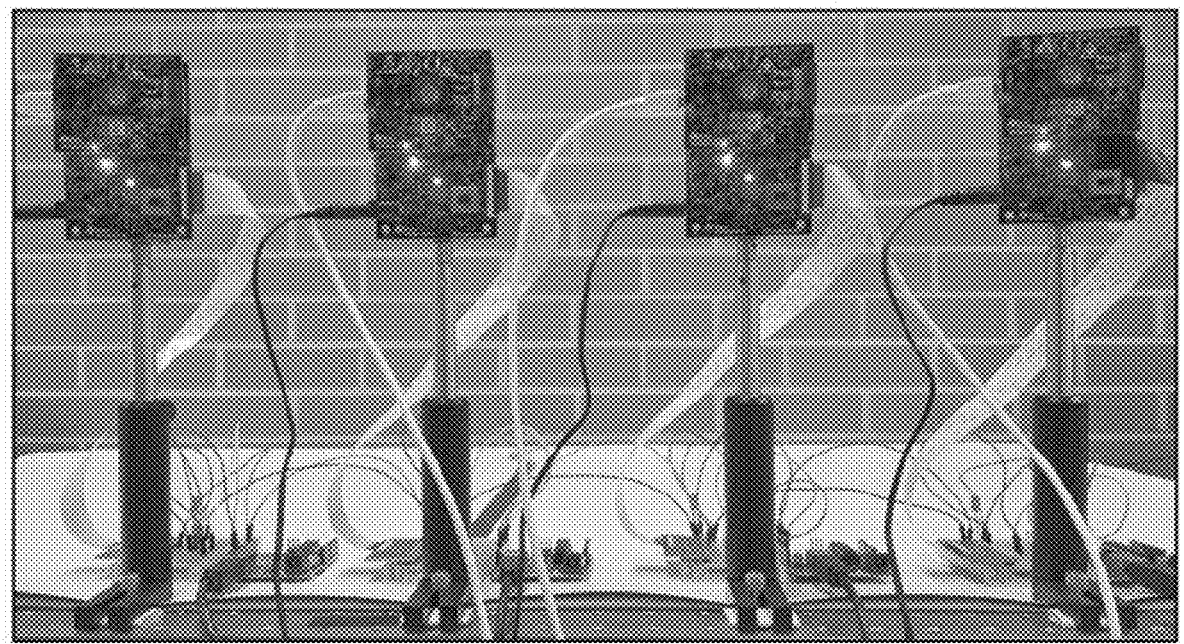
FIG. 12A shows a front view of a system that includes multiple continuous wave time-of-flight cameras configured to implement various coding schemes including an orthogonal AC depth coding scheme (ACO), a stochastic exposure coding scheme (SEC), and a multi-layer coding (CMB) scheme that mitigate multi-camera interference.
Figure 12B:
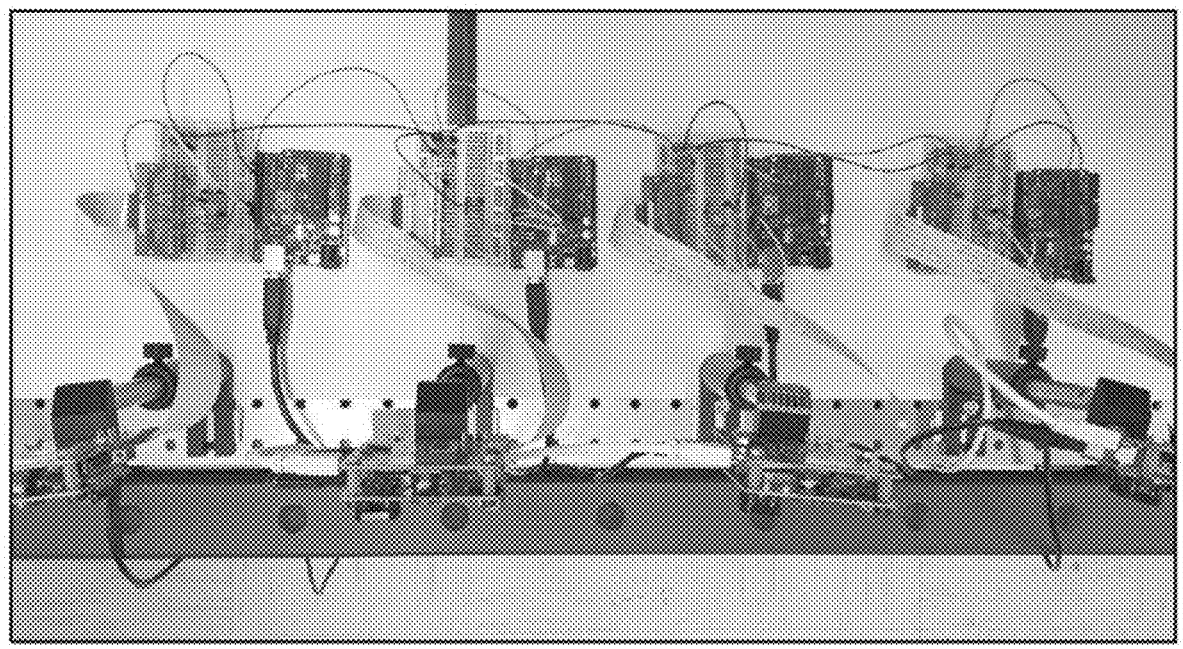
FIG. 12B shows a top view of the system depicted in FIG. 12A.

FIGS. 12A and 12B show a front view and side view, respectively, of a system that includes multiple continuous time-of-flight cameras configured to implement various coding schemes including an orthogonal AC depth coding scheme (ACO), a stochastic exposure coding scheme (SEC), and a multi-layer coding scheme (CMB) that mitigate multi-camera interference.

FIGS. 12A and 12B show an example of a hardware prototype that was used to implement ACO, SEC, and CMB schemes. The system of FIGS. 12A and 12B includes four C-ToF cameras (each implemented using a model OPT8241-CDK-EVM camera, available from Texas Instruments) and four microcontrollers (implemented using an UNO board available from Arduino) to generate random binary sequences. Square waves at 50% duty cycle were used as the modulation and demodulation functions. Since a frame is the most basic structure of the camera to access depth values, frames were used to implement slots. For ACO and CMB, a different modulation frequency selected from the group B={18, 20, 22, 24} (MHz) was used for each of the four different cameras. The depth values from all time slots of a primary camera were averaged to obtain a depth value for ACO. For SEC and CMB, the cameras operated in a slave mode to be activated by external pulse generated by an external controller implemented with an Arduino UNO, with the activation in a particular slot being based on a given slot ON probability. The depth values from non-clashed ON slots and all ON slots were averaged to obtain depth values for SEC and CMB, respectively. Due to challenges associated with amplifying peak power of the light source for SEC and CMB schemes, it was lowered instead for ACO using ND filters (NE20A-B filters available from Thorlabs) with an optical density filter, while keeping the total energy consumption the same.

Figure 13A:
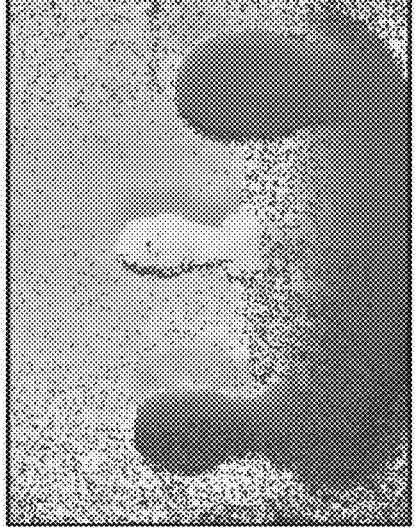
FIG. 13A shows an example of a scene including three mannequin heads on a table at various depths and with various albedo.
Figure 13B:
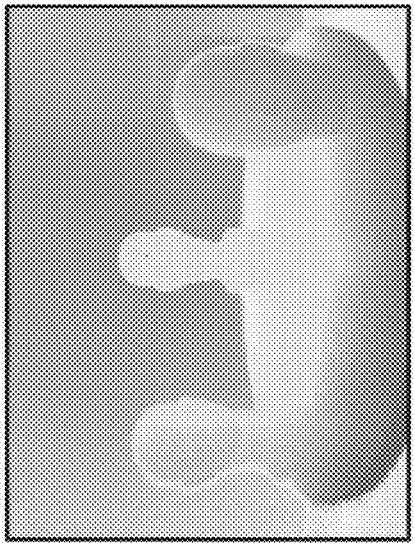
FIG. 13B shows an example of ground truth depths of the scene depicted in FIG. 13A.
Figure 13C:
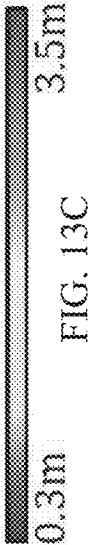
FIG. 13C shows an example of depths of the scene depicted in FIG. 13A calculated based on values generated by one of the continuous wave time-of-flight cameras depicted as part of the system shown in FIGS. 12A and 12B with the four cameras each using an overlapping depth coding scheme.
Figure 13D:
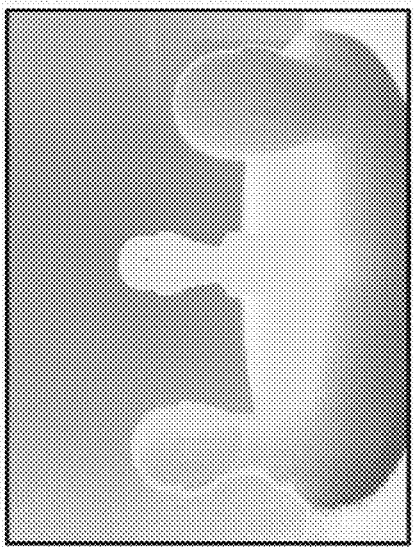
FIG. 13D shows an example of depths of the scene depicted in FIG. 13A calculated based on values generated by one of the continuous wave time-of-flight cameras depicted as part of the system shown in FIGS. 12A and 12B with the four cameras implementing an orthogonal AC depth coding (ACO) scheme.
Figure 13E:
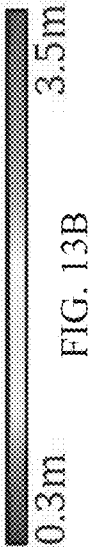
FIG. 13E shows an example of depths of the scene depicted in FIG. 13A calculated based on values generated by one of the continuous wave time-of-flight cameras depicted as part of the system shown in FIGS. 12A and 12B with the four cameras implementing a stochastic exposure coding (SEC) scheme.
Figure 13F:
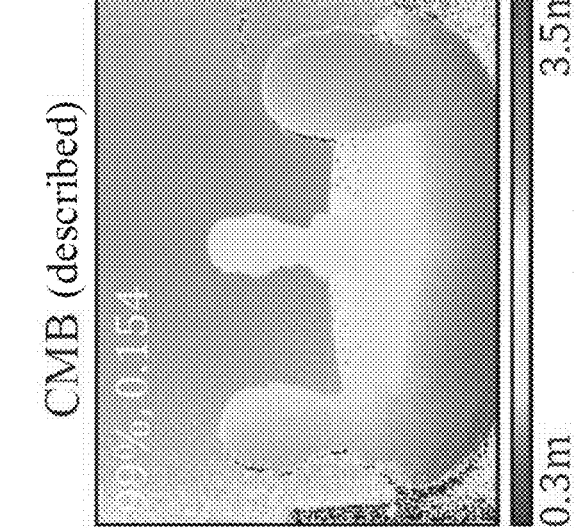
FIG. 13F shows an example of depths of the scene depicted in FIG. 13A calculated based on values generated by one of the continuous wave time-of-flight cameras depicted as part of the system shown in FIGS. 12A and 12B with the four cameras implementing a multi-layer coding (CMB) scheme.

FIGS. 13A to 13F show an example of a scene including three mannequin heads on a table at various depths and with various albedo, an example of ground truth depths of the scene depicted as a depth map, and examples of depth maps reflecting estimated scene depths generated using a conventional depth coding scheme with overlapping modulation signals, an ACO scheme, an SEC scheme, and a CMB scheme, respectively, each implemented using the hardware shown in FIGS. 12A and 12B. In the results shown in FIGS. 13A to 13F, depths at pixels with extremely low amplitude (lowest 1%) were not recovered, and are shown in black as outliers. For each approach, the percentage of inliers, and the RMSE values (in mm) computed at inliers are overlaid on the corresponding depth maps. Note that although systematic depth errors that appear in the interference result shown in FIG. 13C are removed in all the results, the SEC scheme and the CMB scheme show significantly reduced overall noise compared to the ACO scheme. In the examples shown in FIGS. 13A to 13F, $p_{SEC}$ and $p_{CMB}$ were set to 0.125, with $A_0$ at 8, and N=3 (e.g., using EQ. (7), $$p_{SEC} = \min\left(\frac{1}{2N+1}, \frac{1}{A_0}\right) = \min\left(\frac{1}{7}, \frac{1}{8}\right),$$

and using EQ. (9), $$p_{CMB} = \frac{1}{A_0} = \frac{1}{8}\bigg)$$

In some embodiments, the mechanisms described herein can be used with any C-ToF coding scheme. For example, the results in FIGS. 13A to 13F are based on a multi-frequency coding scheme that uses two frequencies for each camera, including the frequencies described above in connection with FIGS. 12A and 12B as base frequencies, and {27, 30, 33, 36} (MHz) as de-aliasing frequencies, with 0.83 ms is used for slot integration time.

FIG. 14A to 14F3 show an example of a scene including objects on a table at various depths and with various different properties, an example of ground truth depths represented as a depth map, an example of a depth map reflecting estimated scene depths generated using a conventional depth coding scheme with overlapping modulation signals, and examples of depth maps reflecting estimated scene depths for three different energy consumption levels using an ACO scheme, an SEC scheme, and a CMB scheme, respectively, each implemented using the hardware shown in FIGS. 12A and 12B. In FIGS. 14D1 to 14F3, the low energy scenario uses a relatively short integration time of 0.83 ms, the medium energy scenario uses a longer integration time of 1.83 ms, and the high energy scenario uses a yet longer integration time of 2.83 ms. In the results shown in FIGS. 14D1 to 14F3, depths at pixels with extremely low amplitude (lowest 1%) were not recovered, and are shown in black as outliers. For each approach, the percentage of inliers, and the RMSE values (in mm) computed at inliers are overlaid on the corresponding depth maps.

Depth estimation results were generated at the different energy consumption levels, and compared among different approaches. Different energy consumption is achieved by changing slot integration time: low energy (0:83 ms), medium energy (1:83 ms), and high energy (2:83 ms). Multi-frequency mode was deactivated and only base frequencies described above in connection with FIGS. 12A and 12B were used for the ACO and CMB schemes, while a single base frequency was used for the SEC scheme. As shown in FIGS. 14D1 to 14F3, the SEC and CMB schemes obtained better results in the low energy scenario than the ACO scheme obtained in the high energy scenario. In particular, with only 30% of the energy consumed for ACO both SEC and CMB achieved superior results.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 7 and 8 can be executed or performed in any order or sequence not limited to the order and sequence shown and described in the figures. Also, some of the above steps of the processes of FIGS. 7 and 8 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for estimating the depth of a scene, the system comprising:
   a light source;
   an image sensor comprising at least one pixel;
   a signal generator configured to output at least:
      a first signal corresponding to a modulation function;
   at least one hardware processor that is programmed to:
      stochastically select, from a plurality of slots each corresponding to a portion of a total capture time, a first subset of the plurality of slots as active slots and a second subset of the plurality of slots as inactive slots based on a probability p of activating each slot of the plurality of slots;
      cause, during each of the active slots, the light source to emit first modulated light toward the scene with modulation based on the first signal;
      cause, during each of the active slots, the image sensor to generate a first value based on the light received from a portion of the scene and a second signal corresponding to a first demodulation function;
      cause, during each of the active slots, the image sensor to generate a second value based on light received from the portion of the scene and a third signal corresponding to a second demodulation function;

cause, during each of the active slots, the image sensor to generate a third value based on light received from the portion of the scene and a fourth signal corresponding to a third demodulation function;

inhibit, during each of the inactive slots, the light source from emitting modulated light toward the scene;

determine, for each of a plurality of the active slots, a depth estimate for the portion of the scene based on the first value, the second value, and the third value; and determine, for the total capture time, a depth estimate for the portion of the scene based on the depth estimates for each of the plurality of the active slots.

2. The system of claim 1, the at least one hardware processor that is further programmed to:

determine, for each active slot, a total intensity received by the image sensor during the active slot;

determine that a clash has occurred for each active slot in which the total intensity exceeds a threshold; and in response to determining that a clash has occurred for a particular active slot, exclude that active slot from the plurality of active slots.

3. The system of claim 2, wherein the at least one hardware processor is further programmed to:

determine a mean total intensity value based on the total intensity values for each active slot; and set the threshold based on a standard deviation of the total intensity values and the mean total intensity value.

4. The system of claim 1, wherein each slot has a duration of in a range of 0.5 ms to 1.0 ms.

5. The system of claim 1, wherein the at least one hardware processor that is further programmed to:

determine, for all of the active slots, a depth estimate for the portion of the scene based on the first value, the second value, and the third value; and determine, for the total capture time, a depth estimate for the portion of the scene based on the depth estimates for each of the active slots.

6. The system of claim 1, wherein the probability p of activating each slot of the plurality of slots is based on the relationship $$p = \frac{1}{A_0},$$

where $A_0$ represents a peak power of the light source.

7. A method for estimating the depth of a scene, the method comprising:

stochastically selecting, from a plurality of slots each corresponding to a portion of a total capture time, a first subset of the plurality of slots as active slots and a second subset of the plurality of slots as inactive slots based on a probability p of activating each slot of the plurality of slots;

causing, during each of the active slots, a light source to emit first modulated light toward the scene with modulation based on a first signal corresponding to a first modulation function;

causing, during each of the active slots, an image sensor to generate a first value based on the light received from a portion of the scene and a second signal corresponding to a first demodulation function;

causing, during each of the active slots, the image sensor to generate a second value based on light received from the portion of the scene and a third signal corresponding to a second demodulation function;

causing, during each of the active slots, the image sensor to generate a third value based on light received from the portion of the scene and a fourth signal corresponding to a third demodulation function;

inhibiting, during each of the inactive slots, the light source from emitting modulated light toward the scene;

determining, for each of a plurality of the active slots, a depth estimate for the portion of the scene based on the first value, the second value, and the third value; and determining, for the total capture time, a depth estimate for the portion of the scene based on the depth estimates for each of the plurality of the active slots.

8. The method of claim 7, further comprising:

determining, for each active slot, a total intensity received by the image sensor during the active slot;

determining that a clash has occurred for each active slot in which the total intensity exceeds a threshold; and in response to determining that a clash has occurred for a particular active slot, excluding that active slot from the plurality of active slots.

9. The method of claim 8, further comprising:

determining a mean total intensity value based on the total intensity values for each active slot; and setting the threshold based on a standard deviation of the total intensity values and the mean total intensity value.

10. The method of claim 7, wherein each slot has a duration of in a range of 0.5 ms to 1.0 ms.

11. The method of claim 7, further comprising:

determining, for all of the active slots, a depth estimate for the portion of the scene based on the first value, the second value, and the third value; and determining, for the total capture time, a depth estimate for the portion of the scene based on the depth estimates for each of the active slots.

12. The method of claim 7, wherein the probability p of activating each slot of the plurality of slots is based on the relationship $$p = \frac{1}{A_0},$$

where $A_0$ represents a peak power of the light source.

13. A non-transitory computer readable medium containing computer executable instructions that, when executed by a processor, cause the processor to perform a method for estimating the depth of a scene, the method comprising:

stochastically selecting, from a plurality of slots each corresponding to a portion of a total capture time, a first subset of the plurality of slots as active slots and a second subset of the plurality of slots as inactive slots based on a probability p of activating each slot of the plurality of slots;

causing, during each of the active slots, a light source to emit first modulated light toward the scene with modulation based on a first signal corresponding to a first modulation function;

causing, during each of the active slots, an image sensor to generate a first value based on the light received from a portion of the scene and a second signal corresponding to a first demodulation function;

causing, during each of the active slots, the image sensor to generate a second value based on light received from the portion of the scene and a third signal corresponding to a second demodulation function;

causing, during each of the active slots, the image sensor to generate a third value based on light received from the portion of the scene and a fourth signal corresponding to a third demodulation function;

inhibiting, during each of the inactive slots, the light source from emitting modulated light toward the scene;

determining, for each of a plurality of the active slots, a depth estimate for the portion of the scene based on the first value, the second value, and the third value; and determining, for the total capture time, a depth estimate for the portion of the scene based on the depth estimates for each of the plurality of the active slots.

14. The non-transitory computer-readable medium of claim 13, wherein the method further comprises:

determining, for each active slot, a total intensity received by the image sensor during the active slot;

determining that a clash has occurred for each active slot in which the total intensity exceeds a threshold; and in response to determining that a clash has occurred for a particular active slot, excluding that active slot from the plurality of active slots.

15. The non-transitory computer-readable medium of claim 14, wherein the method further comprises:

determining a mean total intensity value based on the total intensity values for each active slot; and setting the threshold based on a standard deviation of the total intensity values and the mean total intensity value.

16. The non-transitory computer-readable medium of claim 13, wherein each slot has a duration of in a range of 0.5 ms to 1.0 ms.

17. The non-transitory computer-readable medium of claim 13, wherein the method further comprises:

determining, for all of the active slots, a depth estimate for the portion of the scene based on the first value, the second value, and the third value; and determining, for the total capture time, a depth estimate for the portion of the scene based on the depth estimates for each of the active slots.

18. The non-transitory computer-readable medium of claim 13, wherein the probability p of activating each slot of the plurality of slots is based on the relationship $$p = \frac{1}{A_0},$$

where $A_0$ represents a peak power of the light source.

* * * * *